United States Patent
Dreyer et al.

(10) Patent No.: US 12,353,463 B1
(45) Date of Patent: Jul. 8, 2025

(54) MEANING SUMMARIZATION TECHNIQUES

(71) Applicant: Amazon Technologies, Inc., Seattle, WA (US)

(72) Inventors: Markus Dreyer, Seattle, WA (US); Can Liu, Issaquah, WA (US); Sujith Ravi, Menlo Park, CA (US)

(73) Assignee: Amazon Technologies, Inc., Seattle, WA (US)

(*) Notice: Subject to any disclaimer, the term of this patent is extended or adjusted under 35 U.S.C. 154(b) by 356 days.

(21) Appl. No.: 17/218,473

(22) Filed: Mar. 31, 2021

(51) Int. Cl.
*G06F 17/00* (2019.01)
*G06F 16/3329* (2025.01)
*G06F 16/34* (2019.01)
*G10L 15/18* (2013.01)
*G10L 15/183* (2013.01)

(52) U.S. Cl.
CPC ........ *G06F 16/345* (2019.01); *G06F 16/3329* (2019.01); *G10L 15/1815* (2013.01); *G10L 15/183* (2013.01)

(58) Field of Classification Search
CPC ............... G06F 16/345; G06F 16/3329; G10L 15/1815; G10L 15/183
See application file for complete search history.

(56) References Cited

U.S. PATENT DOCUMENTS

| | | | |
|---|---|---|---|
| 9,502,029 B1* | 11/2016 | Bell | G10L 15/22 |
| 9,542,945 B2* | 1/2017 | Lloyd | G10L 15/18 |
| 11,038,934 B1* | 6/2021 | Hansen | G10L 15/22 |
| 11,081,104 B1* | 8/2021 | Su | G06F 40/216 |
| 11,232,266 B1* | 1/2022 | Biswas | G06F 40/35 |
| 11,380,304 B1* | 7/2022 | Ponnusamy | G10L 15/1822 |
| 11,948,563 B1* | 4/2024 | Liu | G06Q 30/0633 |
| 2015/0161997 A1* | 6/2015 | Wetsel | G06F 3/167 704/275 |
| 2020/0379787 A1* | 12/2020 | Martin | G06N 3/006 |
| 2021/0233512 A1* | 7/2021 | Peyser | G10L 15/1815 |
| 2022/0084524 A1* | 3/2022 | Hou | G06F 16/31 |
| 2023/0377574 A1* | 11/2023 | McCraw | G06F 40/247 |

FOREIGN PATENT DOCUMENTS

| | | | | |
|---|---|---|---|---|
| CN | 111651996 A | * | 9/2020 | |
| CN | 112148863 A | * | 12/2020 | G06F 16/3329 |

* cited by examiner

Primary Examiner — Laurie A Ries
(74) Attorney, Agent, or Firm — Pierce Atwood LLP

(57) ABSTRACT

Techniques for generating a summary of text-based documents are described. A system may be configured to generate a summary based on context data. The system may receive different types of context data corresponding to a user input. The context data may be converted to a linearized representation so that it can be processed by a decoder along with a source document for which the summary is being generated.

16 Claims, 17 Drawing Sheets

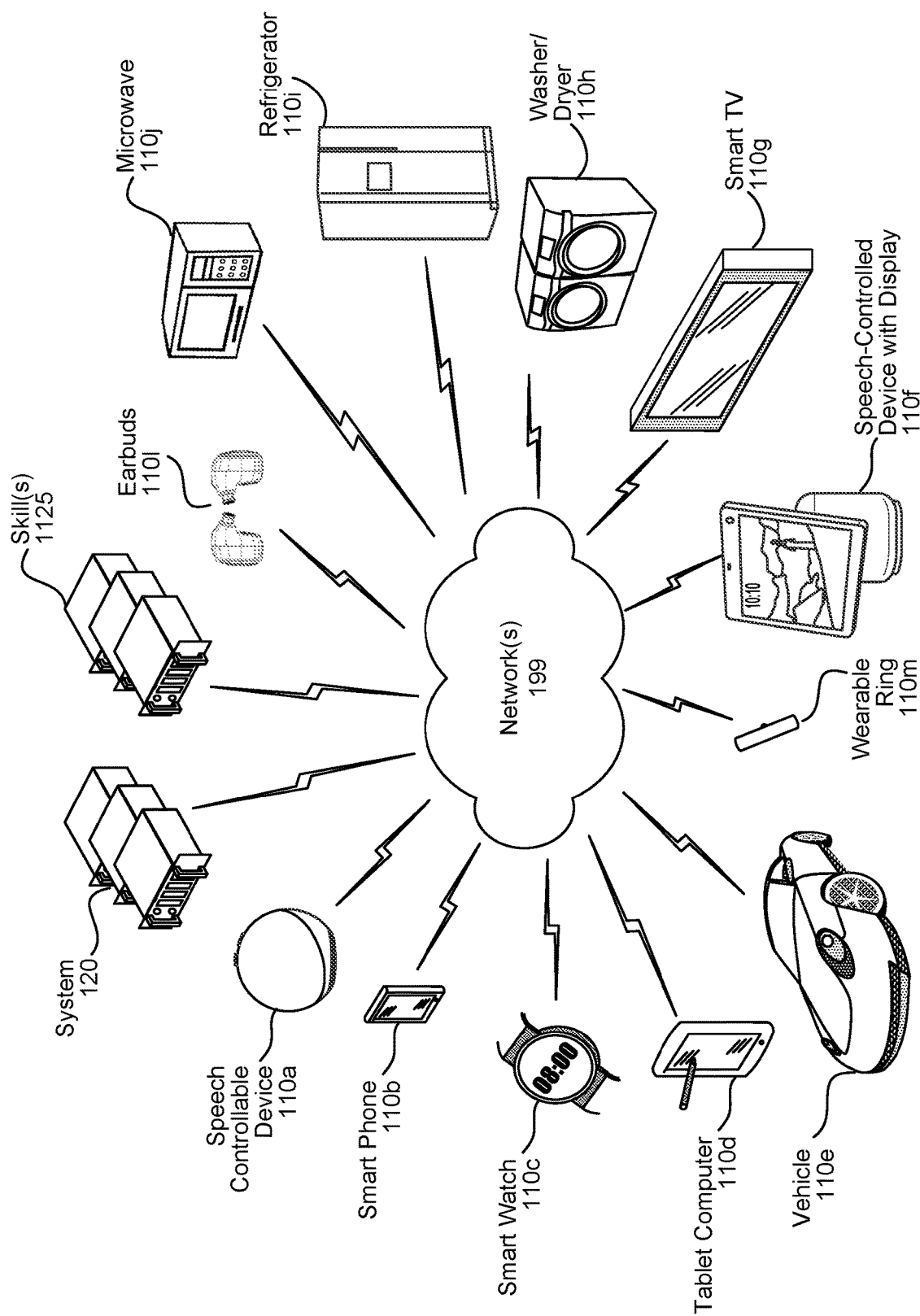

MEANING SUMMARIZATION TECHNIQUES

BACKGROUND

Natural language processing systems have progressed to the point where humans can interact with computing devices using their voices and natural language textual inputs. Such systems employ techniques to identify the words spoken and typed by a human user based on the various qualities of received input data. Speech recognition combined with natural language understanding processing techniques enable speech-based user control of computing devices to perform tasks based on the user's spoken inputs. Speech recognition and natural language understanding processing techniques may be referred to collectively or separately herein as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 16 illustrates an example of a computer network for use with the overall system, according to embodiments of the present disclosure.

DETAILED DESCRIPTION

Figure 1:
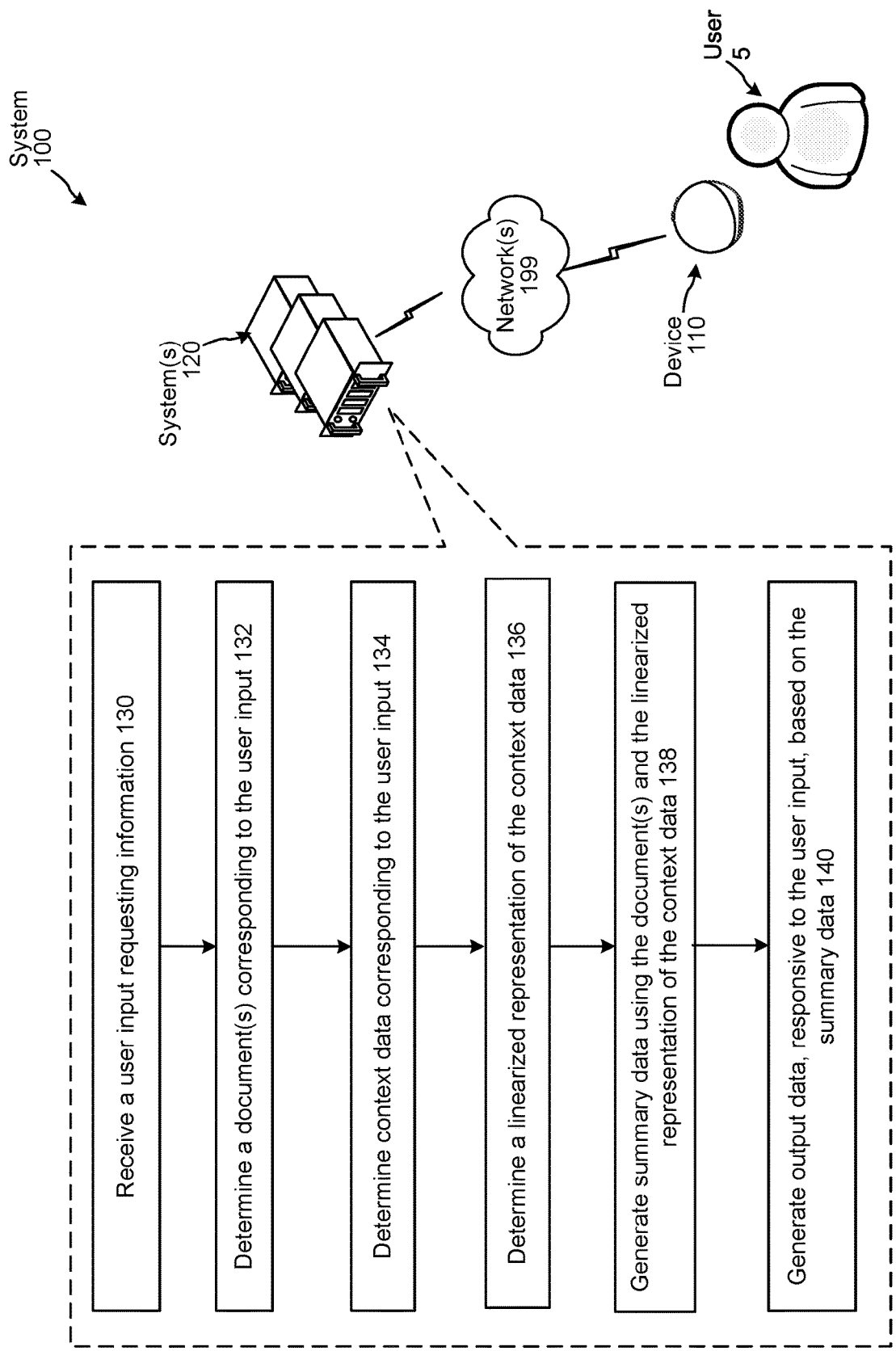
FIG. 1 is a conceptual diagram illustrating a system configured to generate a summary in response to a user input, according to embodiments of the present disclosure.

Automatic speech recognition (ASR) is a field of computer science, artificial intelligence, and linguistics concerned with transforming audio data associated with speech into a token(s) or other textual representation of that speech. Natural language understanding (NLU) is a field of computer science, artificial intelligence, and linguistics concerned with enabling computers to derive meaning from natural language user inputs (such as spoken inputs). ASR and NLU are often used together as part of a spoken language understanding (SLU) processing component of a system. Text-to-speech (TTS) is a field of computer science, artificial intelligence, and linguistics concerned with transforming text and/or other data into audio data synthesized to resemble human speech.

Certain systems may be configured to perform actions responsive to user inputs. In some cases, the systems may output information that is summarized from one or more source documents. For example, for the user input of "Alexa, what's happening in politics today," a system may output a summary of current news related to politics. For further example, for the user input of "Alexa, tell me about [celebrity]," the system may output a summary, of information about the celebrity, based on information available on the Internet. In this manner, to respond to user inputs, and for other reasons, the systems may generate summaries for various different topics (e.g., politics, science, economy, technology, health, entertainment, etc.) and entities (e.g., persons, places, products, etc.).

Automatic summarization as described herein includes the task of using machine learning to generate concise text-based or other type of a summary that expresses the meaning of content of one or more input source documents. The present disclosure describes techniques for generating content summaries based on context data. For example, the system of the present disclosure may generate a summary based on a type of user query (so that the summary is responsive to the user query), an entity included in the user query, and/or one or more user preferences. The system may generate different summaries from the same source document(s).

To generate the summary, the system may employ an encoder-decoder architecture. In some embodiments, the system of the present disclosure may determine various types of context data corresponding to a user and/or a user input provided by the user. The system may process the context data to determine a linearized representation (e.g., a sequence of tokens) of the context data. The system may process the linearized representation of the context data using a context encoder to transform the context data into data vectors that the decoder can process along with the encoded source documents to generate a summary. The decoder may generate a summary while focusing on both of the source document(s) and the context data using an attention mechanism.

The techniques of the present disclosure may provide an improved user experience by providing summaries that are tailored to a particular situation/context.

A system according to the present disclosure may be configured to incorporate user permissions and may only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The systems, devices, components, and techniques can be implemented on a geographic basis to ensure compliance with laws in various jurisdictions and entities in which the components of the systems, devices, components, and/or user are located.

As used herein, processing one or more source documents and generating summary data, may include processing text data, tokens, audio data, or other meaning representation data corresponding to the words in the source documents, and generating text data, tokens or other meaning representation data corresponding to the words to be included in the summary.

FIG. 1 is a conceptual diagram illustrating a system 100 configured to generate summarized data by processing multiple input data, according to embodiments of the present disclosure. Although the figures and discussion of the present disclosure illustrate certain steps in a particular order, the steps described may be performed in a different order (as well as certain steps removed or added) without departing from the present disclosure. As shown in FIG. 1, the system 100 may include the device 110 (local to a user 5) in communication with the system(s) 120 across a network(s) 199. The network(s) 199 may include a local-area network(s) (LAN(s)), a wireless local-area network(s) (WLAN(s)), a Metropolitan Area Network(s), a Wide Area Network(s), a Campus Area Network(s), a mobile carrier system(s), and/or the like.

The system(s) 120 receives (130) a user input requesting information. In some embodiments, the user input may be a natural language input spoken by the user 5, and the device 110 may capture audio representing the spoken input. The device 110 may send the audio data (representing the captured audio) to the system(s) 120 for processing. In some embodiments, the user input may be a typed natural language input provided by the user 5 at the device 110, and the device 110 may send text data representing the typed input to the system(s) 120 for processing. In other embodiments, the user input may be a gesture, and the device 110 may capture one or more images representing the gesture provided by the user 5. In such embodiments, the device 110 may send image data representing the image(s) to the system(s) 120 for processing. In yet other embodiments, the user input may be selection of content (e.g., icons, buttons, etc.) displayed at the device 110. The device 110 may send data corresponding to the user input to the system(s) 120 for processing. The system(s) 120 may determine, for example based on NLU processing, that the user input is a request for information.

The system(s) 120 determines (132) a document(s) corresponding to the user input. The document(s) may include data derived from one or more articles, one or more blog posts, one or more websites, one or more product reviews, and/or other publicly available information (for example, on the Internet). The document(s) may relate to a particular topic (e.g., entertainment, news, politics, technology, health, etc.) and/or entity (e.g., a person, a place, a thing, etc.). The system(s) 120 may determine that the document(s) relates to the information requested in the user input. The document(s) may include text data. In other embodiments, the document(s) may include other meaning representation data, such as, audio data, video data, language-agnostic data, token-based meaning representation data, etc.

The system(s) 120 determines (134) context data corresponding to the user input. The system(s) 120 may determine various different types of context data corresponding to the user input, based on which context data is available or applicable to the user input. Example context data may include user preferences for the user 5, an interaction history corresponding to past interactions between the user 5 and the system(s) 120, an input type (e.g., general question, news question, product question, etc.) corresponding to the user input, an entity or other keyword(s) included in the user input, speech attributes corresponding a spoken input, user feedback, a dialog history (if the user input is during a presently on-going dialog), and other types of context data.

The system(s) 120 determines (136) a linearized representation of the context data. The linearized representation of the context data, in some embodiments, may be a sequence of tokens representing the context data. For example, if the context data includes an entity name included in the user input, then the linearized representation may include tokens corresponding to the entity name. As another example, if the context data includes user location, then the linearized representation may include tokens corresponding to the location name. The linearized representation of the context data may be a set of data vectors or a data matrix.

The system(s) 120 generates (138) summary data using the document(s) and the linearized representation of the context data. In some embodiments, the system(s) 120 may determine encoded data using the document(s), and determine encoded context data using the linearized representation of the context data. In some embodiments, the system(s) 120 may process the document(s) and the linearized context data using the same encoder. In some embodiments, the system(s) 120 may process the document(s) and the linearized context data using different separate encoders. The system(s) 120 may process the encoded data and the encoded context data using a decoder and an attention mechanism, which is configured to cause the decoder to focus on the tokens represented in the context data while choosing words from the document(s) to include in the summary data. The summary data may be text data, token data, or other data representing meaning/natural language meaning.

The system(s) 120 generates (140) output data, responsive to the user input, based on the summary data. The system(s) 120 may send the output data to the device 110 to present to the user 5 or another device to present to the user 5 or another user. For example, the system(s) 120 may determine synthesized speech using the summary data, and send the synthesized speech to the device 110 for output to the user 5. In another example, the system(s) 120 may generate text data based on the summary data, and send the text data to the device 110 for display to the user 5. For further example, the system(s) 120 may send audio data (including the synthesized speech) and summary data to the device 110 (and/or another device associated with the same profile data), and the device 110 (and/or other device) may output the synthesized speech and display text corresponding to the summary data.

The present disclosure describes various embodiments for generating summary data that can be used to respond to a user input. In some embodiments, the system(s) 120 may generate summary data in (almost) real-time with when the user input is received by the system(s) 120 and using context data corresponding to the user input. Such embodiments are described below in relation to FIGS. 2, 3 and 4.

In other embodiments, the system(s) 120 may, before receiving a user input: generate summary data for various documents using predefined context data; store the summary data; receive a user input after storing the summary data; and retrieve the summary data to respond to the user input. Such embodiments are described below in relation to FIGS. 5, 6, 7A and 7B.

In yet other embodiments, the system(s) 120 may, before receiving a user input, generate summary data for various documents using predefined context data and store the summary data. After a user input is received, the system(s) 120 may retrieve stored summary data and edit it based on context data corresponding to the user input. Such embodiments are described below in relation to FIGS. 8 and 9.

Figure 2:
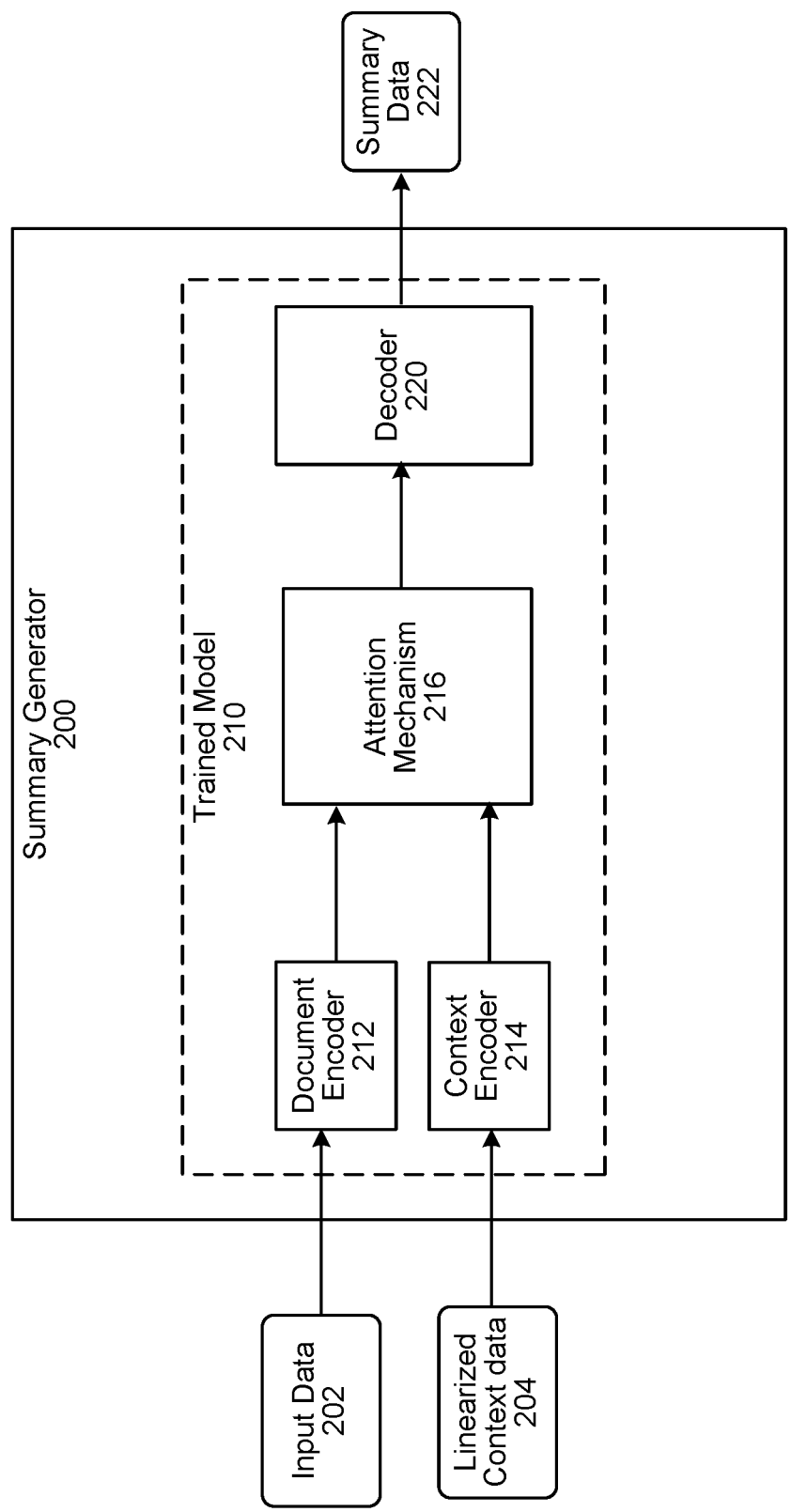
FIG. 2 is a conceptual diagram showing how a system may generate summary data using context data corresponding to a user input, according to embodiments of the present disclosure.

FIG. 2 is a conceptual diagram showing how a summary generator 200 may generate summary data using context data corresponding to a user input. For example, the summary generator 200 may generate a first summary for input data based on a first keyword in the input text data, and thus, the first summary may focus on information, from the input data, related to the first keyword. For further example, the summary generator 200 may generate a second summary for the same input data based on a second keyword in the input data, and thus, the second summary may focus on information, from the input data, related to the second keyword.

The summary generator 200 may include various components, such as a document encoder 212, a context encoder 214, an attention mechanism 216 and a decoder 220. These components may be part of a trained model 210 as shown in FIG. 2. The summary generator 200 may employ one or more machine learning models to process input data 202 (for example, representing a document) and linearized context data 204, and generate summary data 222 representing a summary of the input data 202. The summary generator 200 may be configured to generate a summary of information conveyed in input data based on inputted context data.

The input data 202 may be text data, audio data, language-agnostic/token-based meaning representation data, intent/slot data, or other meaning representation data. The input data 202 may include multiple words in a particular natural language (e.g., English, Spanish, Hindi, etc.). The words may be arranged in sentences, paragraphs, sections, etc. In some embodiments, the input data 202 may correspond to one or more documents (e.g., a news article(s), a magazine article(s), one or more blog entries, a webpage(s), product information/description(s), product review(s), and/or other information publicly available on the Internet) relating to a particular topic(s) and/or a particular entity(ies). In some embodiments, the input data 202 may be more than one document from multiple different sources (e.g., different websites, different news sources, and/or different blogs, etc.). In some embodiments, the input data 202 may correspond to the current news and happenings worldwide based on documents that are published within a specified time period (e.g., within the last 24 hours, within the last 3 days, within the last week, etc.).

Example topics may include, but are not limited to, politics, science, economy, technology, health, entertainment, and the like. Example entities may include, but are not limited to, music artists, actors, politicians, celebrities, companies, organizations, landmarks, cities, countries, and the like.

Figure 3:
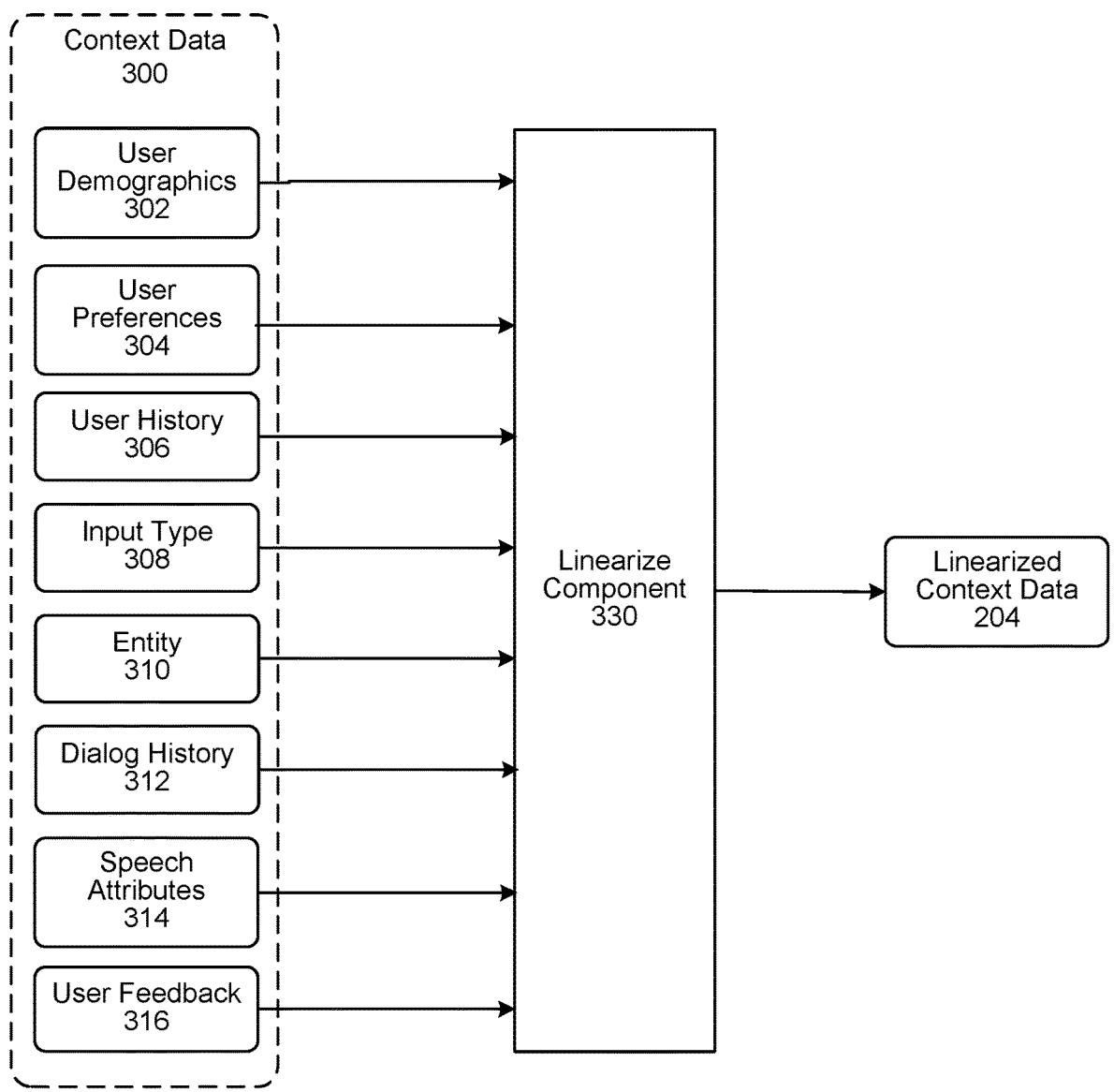
FIG. 3 is a conceptual diagram showing how a system may determine linearized context data corresponding to a user input, according to embodiments of the present disclosure.

The linearized context data 204 may be, in some embodiments, a single data vector including data corresponding to one or more context types. The linearized context data 204, in some embodiments, may be a set of data vectors or a data matrix, where each vector or matrix row (or matrix column) may include data corresponding to a particular context data type. The linearized context data 204 may be token representation of the various context data. FIG. 3 is a conceptual diagram showing how the system(s) 120 may determine the linearized context data 204 corresponding to a user input. The system(s) 120 may use multiple different types of context data to determine the linearized context data 204. For example, as shown in FIG. 3, the system(s) 120 may use user demographics data 302 corresponding to profile data (e.g., from profile storage 1170 shown in FIG. 11 or profile storage 1270 shown in FIG. 12) associated with the user 5, user preferences data 304 corresponding to the profile data, user history data 306 corresponding to the profile data, input type 308 corresponding to the user input provided by the user 5, entity data 310 corresponding to the user input, dialog history data 312 corresponding to an on-going dialog during which the user input was provided, speech attributes data 314 corresponding to the user input (if the user input is a spoken input), and user feedback data 316.

The system(s) 120 may determine the user demographics data 302 from the profile storage 1170/1270 for the user 5, and may be based on information provided by the user 5 and the user 5 approved for use by the system(s) 120. The user demographics data 302 may include data corresponding to, but not limited to, a gender for the user 5, an age for the user 5, a geographic location/region for the user 5, an occupation for the user 5, an education level for the user 5, a native language of the user 5, a marital status of the user 5, and/or a number of members and/or type of members (e.g., children, elderly, pets, etc.) in the user 5 household. In some embodiments, the user demographics data 302 may be a data graph, and the linearize component 330 may be configured to convert the data graph to a data vector to be included in the linearized context data 204. In some embodiments, the linearized context data 204 may include tokens representing the user demographics data 302. In some embodiments, the linearize component 330 may determine binned values, based on the user demographics data 302, and include the binned values in the linearized context data 204.

The system(s) 120 may determine the user preferences data 304 from the profile storage 1170/1270 for the user 5, and may be based on information provided by the user 5, and the user 5 approved for use by the system(s) 120. In some embodiments, the profile storage 1170/1270 may store user preferences based on the past interactions between the user 5 and the system(s) 120. For example, during past interactions, the user 5 may have frequently chosen a particular skill 1190a/1290a (shown in FIGS. 11 and 12) to process a user input over another skill, and the frequently chosen skill 1190a/1290a may be stored in the profile storage 1170/1270 as a preferred skill. The user preferences data 304 may include data corresponding to, but not limited to, a preferred skill(s) for the user 5, a preferred information source(s) for the user 5 (e.g., a preferred news source, a preferred website, a preferred blog, etc.), and/or a preferred output type for the user 5 (e.g., synthesized speech or displayed text). The user preferences data 304 may be a data vector or a data matrix indicating a preference for the user for various categories. If the user 5 does not have a preference for a particular category, the corresponding position in the vector or the corresponding row or column in the matrix may be null/empty. For example, the user preferences data 304 may be the following data vector: {preferred skill: [skill]; preferred news source: [news source]; preferred output type: null}. In another example, the user preferences data 304 may be the following data matrix:

{Preferred skill: [skill_1], [skill_2];
Preferred news source: [news source], [news source]
Preferred output type: null}

The system(s) 120 may determine the user history data 306 from the profile storage 1170/1270 for the user 5, and may be based on past interactions between the user 5 and the system(s) 120, and may be approved for use by the user 5. The user history data 306 may include data corresponding to, but not limited to, a purchase history for the user 5 (e.g., products, books, music, software, etc. purchased by the user 5), inputs provided by the user 5 during past interactions, a skill(s) invoked during past interactions, and/or feedback provided by the user 5 during past interactions. In some embodiments, the user history data 306 may be a data graph, and the linearize component 330 may be configured to convert the data graph to a data vector to be included in the linearized context data 204. In some embodiments, the linearized context data 204 may include tokens representing the user history data 306. In some embodiments, the linearize component 330 may determine binned values, based on the user history data 306, and include the binned values in the linearized context data 204.

Figure 11:
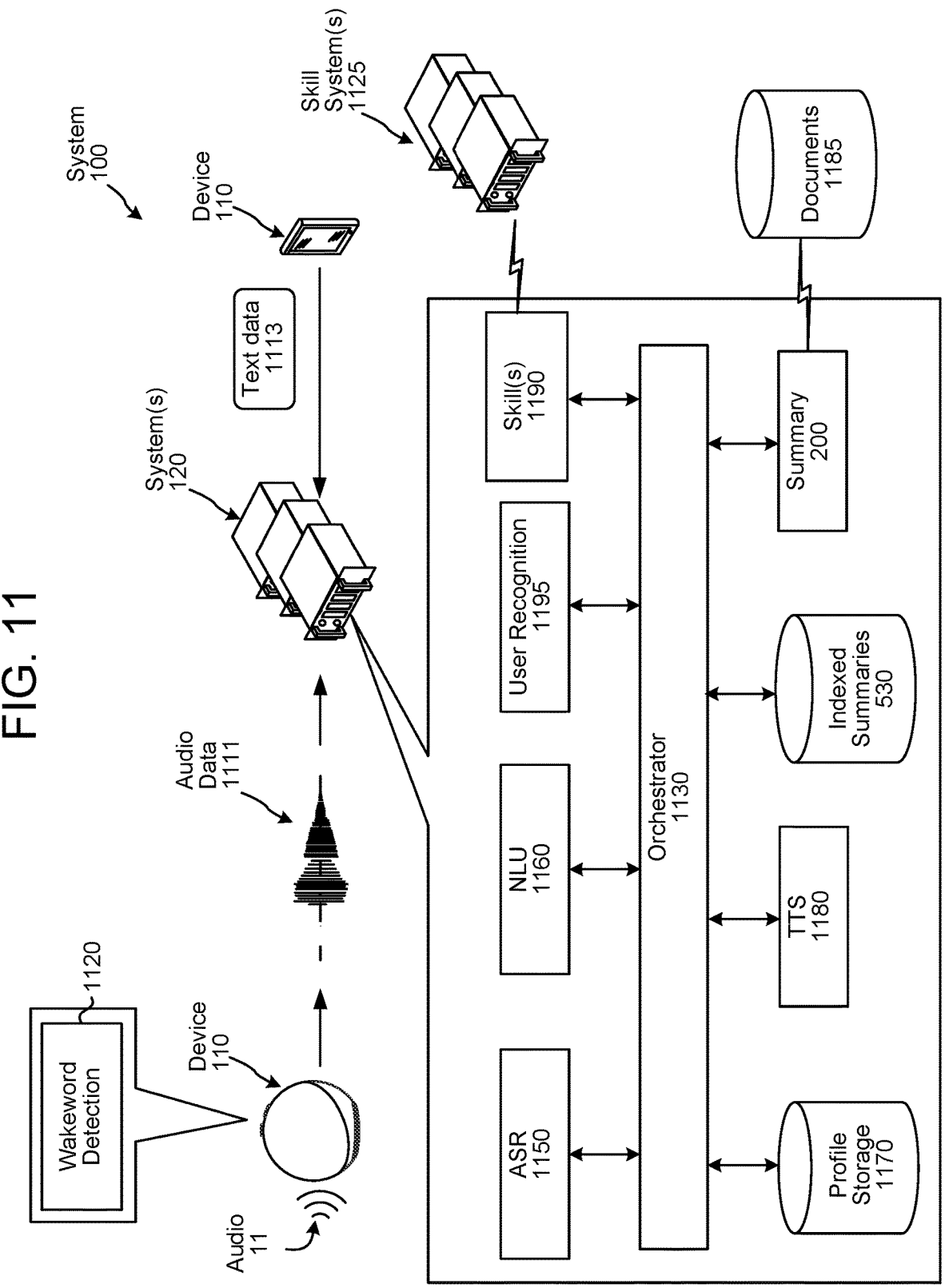
FIG. 11 is a conceptual diagram of components of a system, according to embodiments of the present disclosure.
Figure 12:
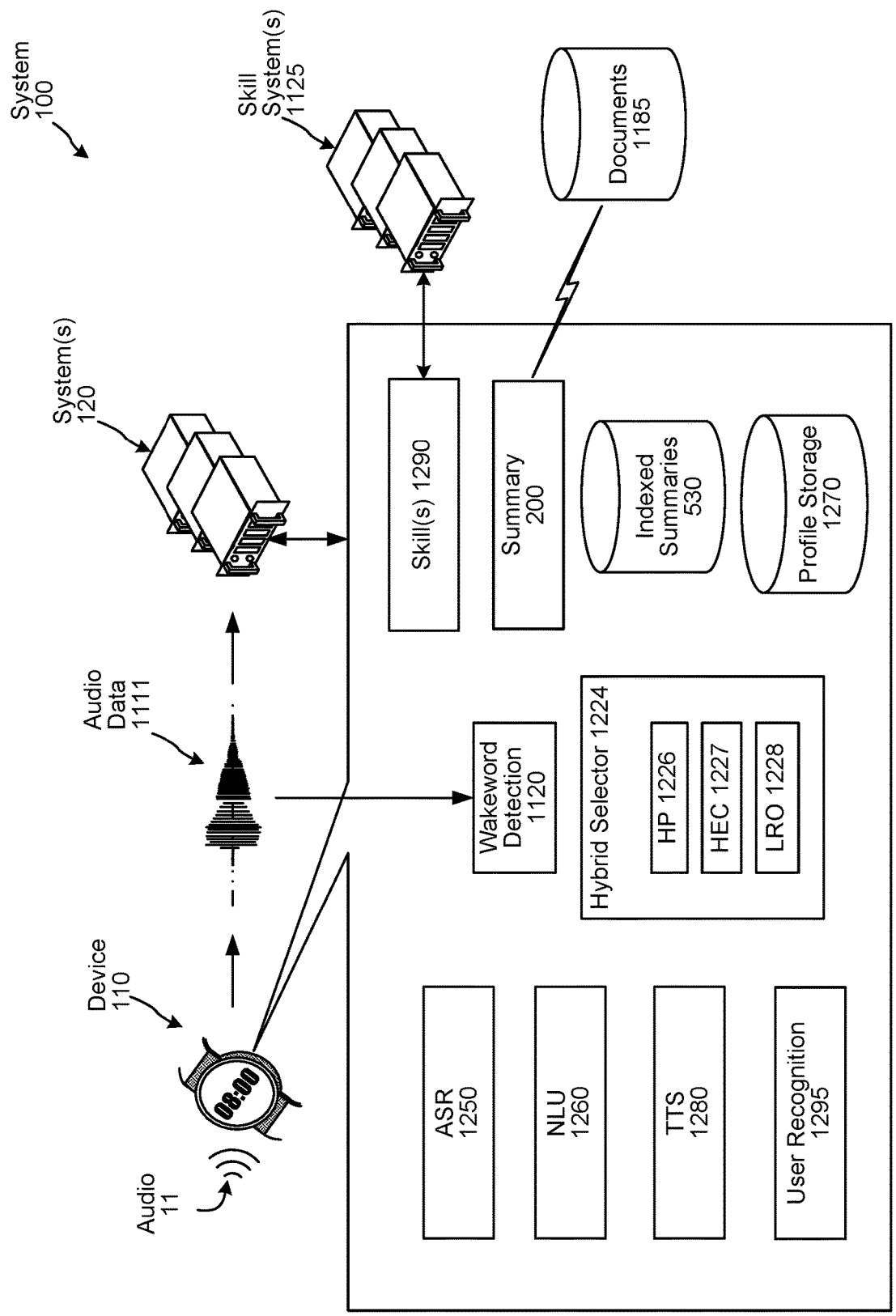
FIG. 12 is a conceptual diagram illustrating components that may be included in a device, according to embodiments of the present disclosure.

The system(s) 120 may determine the input type 308 based on processing of the user input by the NLU component 1160/1260 (shown in FIGS. 11 and 12). The input type 308 may represent a type of query or request provided by the user 5. The input type 308 may be based on an intent corresponding to the user input and determined by the NLU component 1160/1260. The input type 308 may be, for example, a general information question, a product question, a question related to current news, and the like. For example, for the user input "why is the sky blue", the input type 308 may be "general information question." For further example, for the user input "is the [product] adjustable", the input type 308 may be "product question." For another example, for the user input "what happened yesterday in [country]", the input type 308 may be "current news question." The user input may correspond to more than one input type, and thus, the input type 308 may indicate more than one input type. The input type 308 may be a data vector. The summary generator 200 may determine a summary of the document(s) such that the summary is responsive to the input type. For example, a set of documents may relate to a product, and the summary generator 200 may determine a first summary, for the set of the documents, that includes product features and a second summary, for the same set of documents, that includes current news for the product, based on the input type 308.

The system(s) 120 may determine the entity data 310 from the user input, for example, based on processing by the NLU component 1160/1260. The entity data 310 may be token data representing one or more entities corresponding to the user input. The entity data 310 may also be data representing one or more keywords (e.g., adjectives, time periods, etc.) corresponding to the user input. For example, for the user input "why is the sky blue", the entity data 310 may be {"sky", "blue" }. For the user input "is the [product] adjustable", the entity data 310 may be {"[product]", "adjustable" }. For another user input "what happened in [country] yesterday", the entity data 310 may be {"[country]", "yesterday" }. In some embodiments, the entity data 310 may include data indicating a type of the entity, for example, person, place, object, color, time, adjective, etc. The entity data 310 may be a data vector or a data matrix.

The system(s) 120 may determine the dialog history data 312 based on an on-going dialog between the user 5 and the system(s) 120 that involves an exchange of user inputs and system-generated responses. A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. A user input and performance by the system of a corresponding action responsive to the user input (a system-generated response), may be referred to as a dialog "turn." A dialog session identifier may be associated with multiple related turns corresponding to consecutive related user inputs and system outputs. One user input may be considered related to a subsequent user input, thereby causing a single dialog session identifier to be associated with both user inputs, based on, for example, a length of time between receipt of the first user input and receipt of the subsequent user input, a length of time between a system-generated response to the first user input and receipt of the subsequent user input, and/or the substance of the user input or the most-recent system-generated response. The dialog history data 312 may be data (e.g., text data, token data, intent data, entity data, etc.) corresponding to one or more dialog turns, that is, one or more user inputs and corresponding system-generated responses. The data for the user input may be tagged as "user", while the data for the system-generated response may be tagged as "system". For example, the dialog history data 312 may be a data matrix as follows:

{Turn 1: user: "play some music"; system: "what are you in the mood for"
Turn 2: user: "play some jazz"; system: invoke [skill] for jazz music}

The system(s) 120 may determine the speech attributes data 314 based on audio data corresponding to the user input. In some cases, the user 5 may speak the user input, and the device 110 may capture audio of the user input. The speech attributes data 314 may be data (derived from audio data corresponding to the audio) corresponding to, but not limited to, a pitch of the user 5 speech, a tone of the user 5 speech, a rate of the user 5 speech, a volume of the user 5 speech and/or a prosody of the user 5 speech. The speech attributes data 314 may be a data vector or a data matrix. The speech attributes data 314 may include tokens representing one or more the speech attributes corresponding to the user input.

The system(s) 120 may determine the user feedback data 316 based on the user 5 response to a system-generated response, for example, in an on-going dialog. The user 5 may provide explicit feedback to a system-generated response, for example, by speaking (e.g., "thank you," "that's not what I wanted," etc.) or providing feedback input (e.g., selecting a thumbs-up icon, selecting a thumbs-down icon, etc.). The user 5 may provide implicit feedback, for example, by interrupting or cancelling the system response (e.g., saying "stop" or "cancel" while the system is outputting synthesized speech in response to the user input), by rephrasing the previous/initial user input (in hopes of receiving a different system response), etc. The system(s) 120 may determine the user feedback data 316 from audio data representing an input from the user 5, image data captured by the device 110, or other data inputted by the user 5. The system(s) 120 may process image data to determine a sentiment of the user 5, for example, the user 5 is happy with the system-generated response or is upset with the system-generated response. The system(s) 120 may process audio data to determine a sentiment of the user 5. The user feedback data 316 may indicate whether the user 5 provided positive feedback or negative feedback in response to the system-generated response to a previous input. If the system(s) 120 is unable to determine the user feedback data 316, because the user 5 did not provide any feedback inputs or the system(s) 120 is not confident in deriving the user's feedback from the available data, then the user feedback 316 may be null/empty.

The linearize component 330 may use one or more machine learning models or other techniques to determine which of the context data 300 is to be used for generating the summary data. In some embodiments, the linearize component 330 may use a classifier model(s) to process the available context data 300. In determining which of the context data 300 is to be used, the linearize component 330 may determine which of the data 302-316 is to be included in the linearized context data 204. The linearized context data 204 may include a subset of the data 302-316, even though all of the various context data is available. The linearize component 330 may determine which of the data 302-316 to use based on the user input (e.g., the user input received in the step 130 of FIG. 1). The linearize component 330 may also take in, as an input, data representing the user input. The linearize component 330 may determine which of the data 302-316 based on information included in the dialog history data 312, if available. The classifier model(s) may be updated/retrained based on user feedback data (similar to the user feedback data 316) that may be received in response to the output of the summary data 222 that may be based on some particular linearized context data 204.

The linearized component 330 may also determine a weight value to be applied to the context data that is included in the linearized context data 204. For example, the linearize component 330 may determine to include the input type 308 and the entity data 310 in the linearized context data 204, and may determine a first weight value associated with the input type 308 and a second weight value associated with the entity data 310. The weight values may be determined by the classifier model(s). The weight values may be based on a confidence of the system(s) 120 in determining the respective data 302-316. The weight values may be based on which of the data 302-316 is available. The weight values may be predefined for one or more of the data 302-316, such that certain context data is given a higher weight value than other context data (e.g., the input type 308 and the entity data 310 may be weighted higher than other context data, so that the generated summary data corresponds to the input type 308 or the entity data 310 rather than other of the context data).

The linearize component 330 may be configured to convert the different types of context data 300, represented in different forms and data types, to a linearized representation outputted as the linearized context data 204. In generating the linearized context data 204, the linearize component 330 may represent each of the (selected) context data 300 as a sequence of tokens (corresponding to characters, sub-words or words in a natural language) and/or binned values. In some embodiments, the linearize component 330 may attach a specialized token, identifying the type of context data, to the respective context data in the linearized context data 204. For example, the linearized context data 204 may be:

{data vector 1={<input type>: general information}
    data vector 2={<speech attributes>: pitch=high, rate=normal}
    data vector 3={<dialog history>: {user: [input], system: [response]}}.

In the above example, <input type>, <speech attributes> and <dialog history> may be the specialized tokens. For any of the context data 300 that is not available for the user 5 or the instant user input, the respective data may be null/empty, and the corresponding vector or row (or column) in the matrix may be null/empty.

Referring again to FIG. 2, in some embodiments, the trained model 210 may employ an architecture consisting of the document encoder 212, the context encoder 214 and the decoder 220. The document encoder 212 may be configured to understand the words, the context of the words, the semantic meaning of the words, etc. represented in the input data 202. In an example embodiment, the document encoder 212 may be a bidirectional transformer (e.g., BERT or RoBERTa). In some embodiments, the document encoder 212 may employ hierarchical based encoding, graph based encoding, separate encoding, flat encoding, or other techniques.

In some embodiments, the context encoder 214 may be a neural network, transformer-based encoder. The context encoder 214 may process the linearized context data 204 to determine data vectors or a data matrix representing encoded context data corresponding to the user input.

The decoder 220 may be configured to generate tokens corresponding to the words, to be included in the summary, based on the encoder's 212 understanding of the input data 202 and the context represented in the data 204. In an example embodiment, the decoder 220 may be a left-to-right transformer (e.g., GPT-2). The summary generator 200 may process the encoded text data and the encoded context data using the decoder 220 and an attention mechanism 216, which is configured to cause the decoder 220 to focus on the tokens represented in the context data while choosing words from the input data 202 to include in the summary data 222. The decoder 220 may determine the words for the summary data 222, representing a summary, based on the attention mechanism 216 causing the decoder 220 to focus more on certain words based on the linearized context data 204. For example, if the linearized context data 204 indicates entity data (e.g., a product name included in the user input), then the attention mechanism 216 may cause the decoder 220 to select words from the portion(s) of the input data 202 that include the entity, and thus, the summary data 222 may be a summary corresponding to the entity. The summary data 222 may be text data, token data, or other meaning representation data.

Based on the context data represented in the linearized context data 204, the summary generator 200 may generate a different summary for the same input data 202. For example, if the linearized context data 204 indicates a particular entity name is included in the user input, then the summary generator 200 may generate the summary data 222 representing a first summary focusing on the entity name in the input data 202. For further example, if the linearized context data 204 indicates a particular input type, then the summary generator 200 may generate the summary data 222 representing a second summary, for the input data 202, responsive to the input type.

Figure 4:
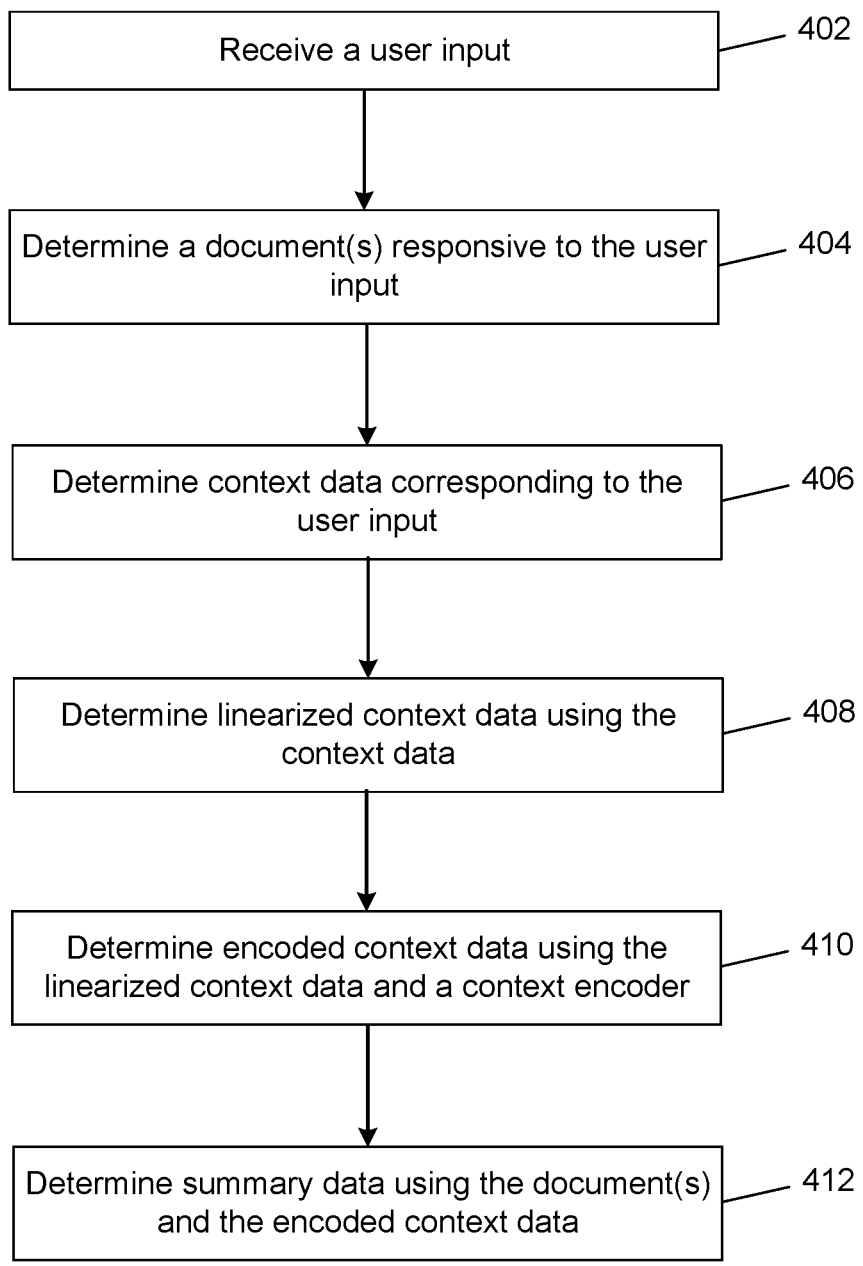
FIG. 4 is a flowchart illustrating a process that the system of FIG. 2 may perform to determine summary data responsive to a user input, according to embodiments of the present disclosure.

FIG. 4 is a flowchart illustrating a process that the system(s) 120 may perform to determine summary text data responsive to a user input in real-time. The system(s) 120 may receive (402) a user input. The user input may be a spoken natural language input, a text/typed natural language input, a gesture, selection of data at a display device, or other type of input. In some embodiments, the system(s) 120 may determine that the intent of the user input is to receive information relating to a topic or an entity. The system(s) 120 may determine that an appropriate response to the user input is to provide summarized information from one or more documents (e.g., articles, websites, product description, product reviews, etc.).

The system(s) 120 may determine (404) a document(s) responsive to the user input. The system(s) 120 may perform a search (e.g., an ElasticSearch) of published information on the Internet, and may use one or more entities or keywords included in the user input to perform the search. The system(s) 120 may determine one or more documents as containing information that is responsive to the user input. For example, if the user input is requesting information on a product, then the system(s) 120 may identify one or more websites providing information on the product. As a further example, if the user input is requesting information on current news for a specified geographic region, then the system(s) 120 may identify one or more news articles for the specific region that were published recently.

The system(s) 120 may determine (406) context data corresponding to the user input. For example, the system(s) 120 may determine data for one or more of the context data 300 shown in and as described above in relation to FIG. 3. The system(s) 120 may determine (408) linearized context data using the context data (determined in the step 406), as described above in relation to FIG. 3.

The system(s) 120 may determine (410) encoded context data using the linearized context data and a context encoder (e.g., the context encoder 214 shown in FIG. 2). The system(s) 120 may determine (412) summary data (e.g., the summary data 222) using encoded document(s) data and the encoded context data. The system(s) 120 may determine the summary data 222 as described above in relation to FIG. 2. The summary data 222 may represent a summary of the document(s) that is tailored to the context data.

Figure 5:
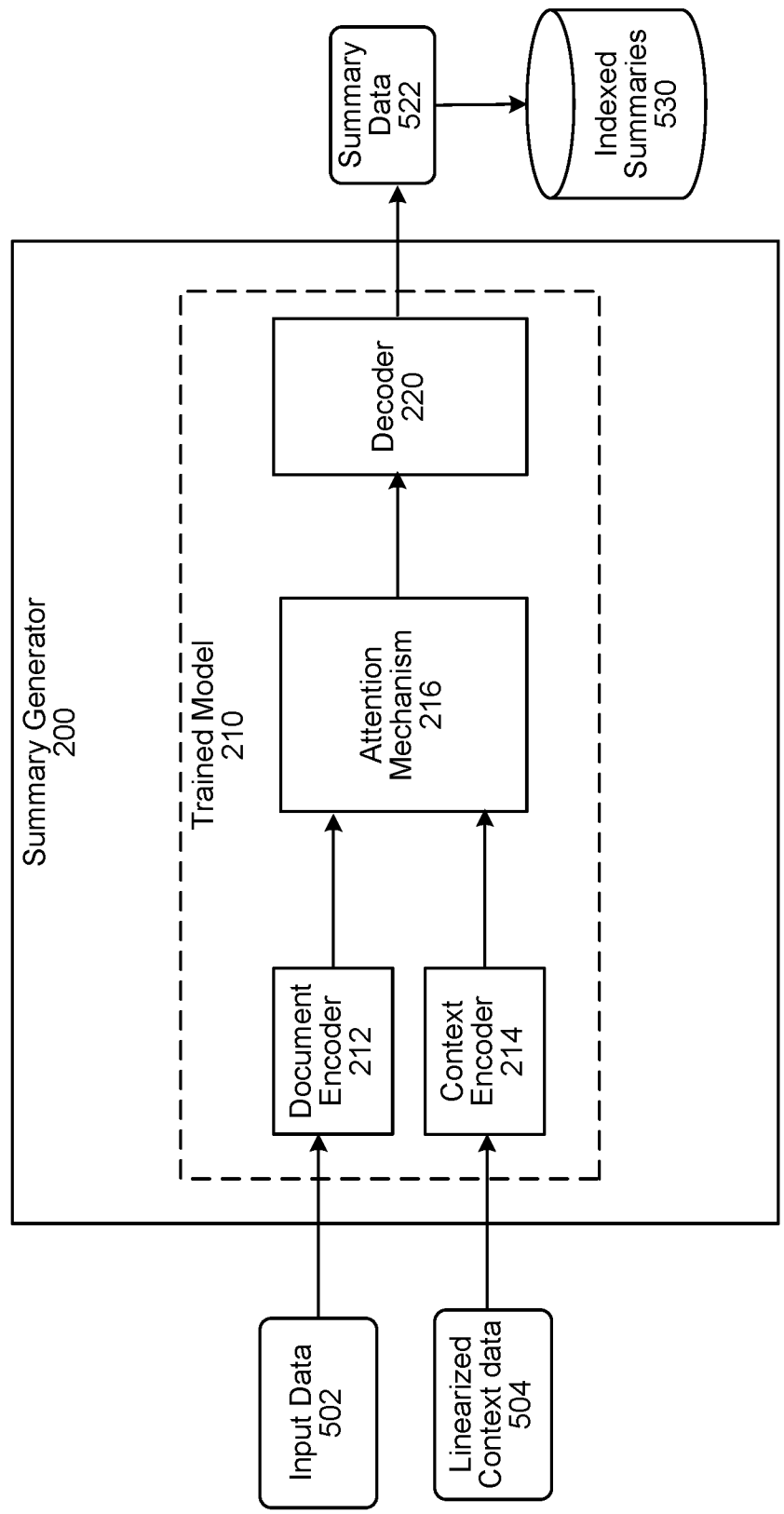
FIG. 5 is a conceptual diagram showing how a system may generate summary data using predefined context data, according to embodiments of the present disclosure.
Figure 7A:
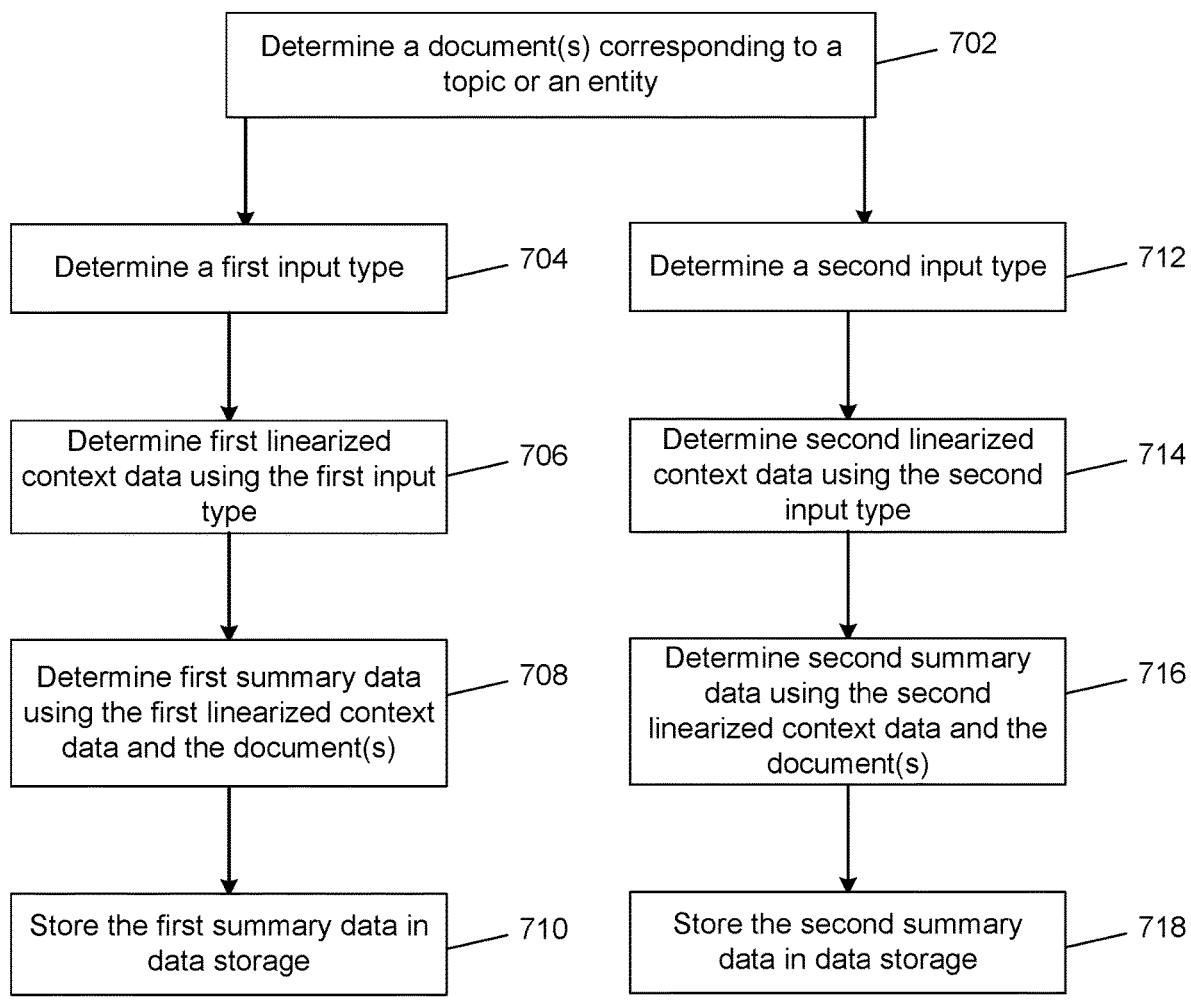
FIG. 7A-7B are flowcharts illustrating processes that the system of FIG. 5 may perform to determine and store summary data based on predefined context data, according to embodiments of the present disclosure.
Figure 7B:
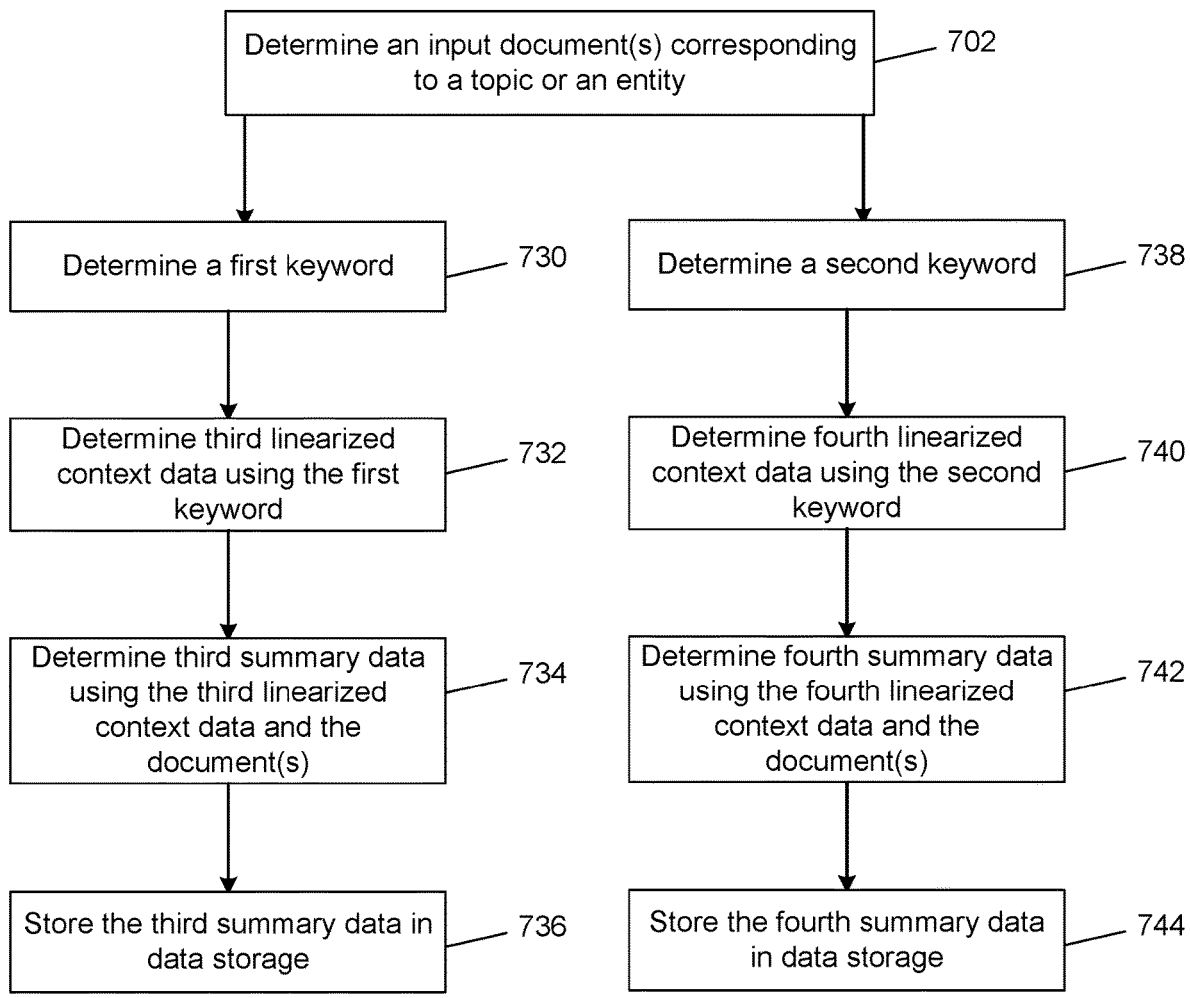

FIG. 5 is a conceptual diagram showing how the summary generator 200 may generate summary text data using predefined context data, according to embodiments of the present disclosure. In some embodiments, the summary generator 200 may be used to generate summaries for one or more documents, where each of the summaries may be based on a different context data type, such as an entity and/or an input type. In such embodiments, the system(s) 120 may pre-generate summaries for different context data types, store the generated summaries, and then retrieve a relevant summary to respond to a user input received after the summaries are stored. FIG. 7A-7B are a flowcharts illustrating processes that the system(s) 120 may perform to determine and store summary text data based on predefined context data.

The system(s) 120 may determine (702) a document(s) (e.g., the input data 502) corresponding to a topic and/or an entity. In some embodiments, the input data 502 may be referred to as a document relating to a particular topic(s) and/or a particular entity(ies). In some embodiments, the input data 502 may correspond to separate (and different) documents and they may be from multiple different sources (e.g., different websites, different news sources, different blogs, etc.). In an example embodiment, the input data 502 may include a news article, a magazine article, a blog entry, and/or a website article, etc. that may be publicly available on the Internet (or stored by the system(s) 120 in a knowledge base). In some embodiments, the input data 502 may relate to currently trending topics and/or entities, and may correspond to the current news and happenings worldwide. In some embodiments, the system(s) 120 may search the Internet and/or a knowledge base(s) (stored by the system(s) 120) for the input data 502. In its search, the system(s) 120 may search for trending topics and/or may search for information (e.g., articles, blogs, etc.) that is published within a specified time period (e.g., within the last 24 hours, within the last 3 days, within the last week, etc.). Based on the search, the system(s) 120 may determine the document(s) and the input data 502. The input data 502 may be text data, audio data, language-agnostic/token-based meaning representation data, intent/slot data, or other meaning representation data.

Example topics may include, but are not limited to, politics, science, economy, technology, health, entertainment, and the like. Example entities may include, but are not limited to, music artists, actors, politicians, celebrities, companies, organizations, landmarks, cities, countries, and the like.

Figure 6:
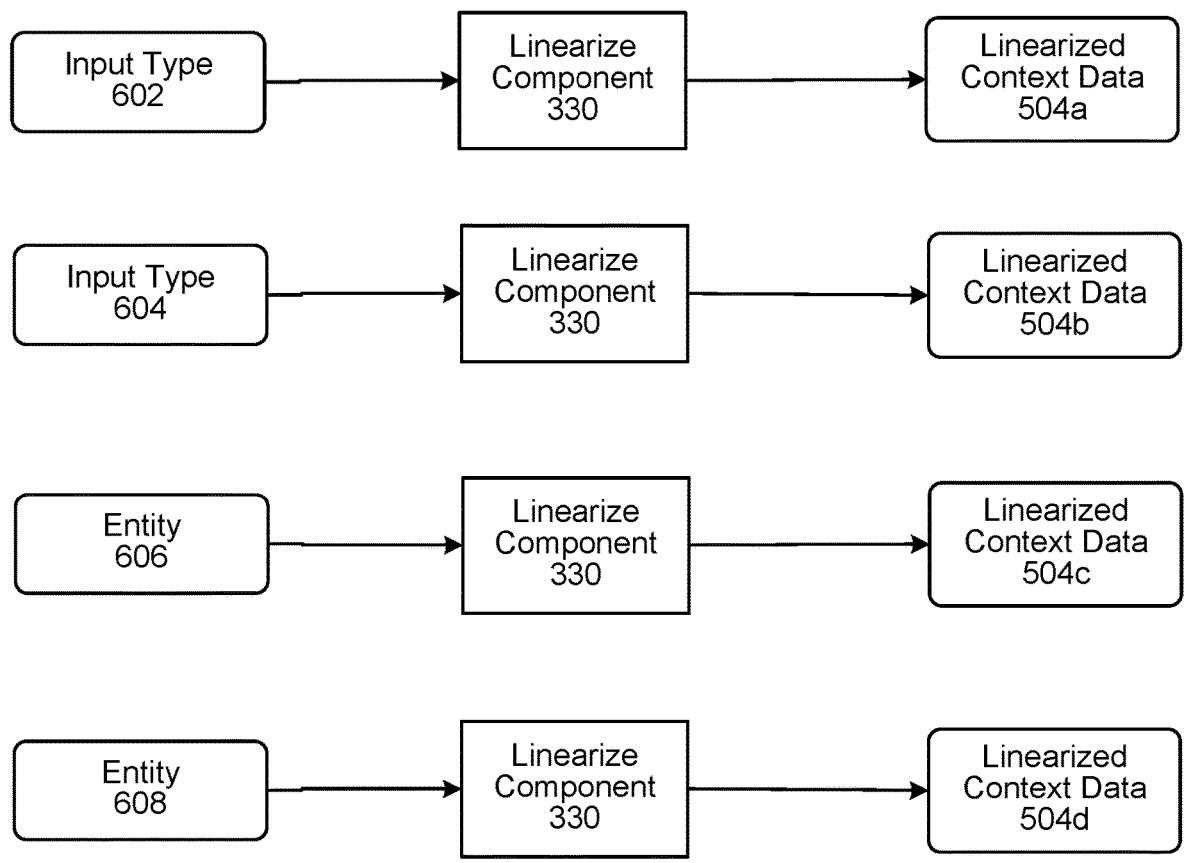
FIG. 6 is a conceptual diagram showing how a system may determine linearized context data corresponding to predefined context data, according to embodiments of the present disclosure.

To pre-generate summaries focusing on different context data, the system(s) 120 may use predefined context data, for example, as shown in FIG. 6. For example, the system(s) 120 may determine (704) a first input type (e.g., a knowledge question), and determine the input type data 602 based on the first input type. The first input type, as the knowledge question type, may be predefined or may be based on the topic and/or entity corresponding to the document(s). For example, if the document(s) correspond to a product, then the first input type (or second input type) may be a product question.

The system(s) 120 may determine (706) first linearized context data using the first input type. The system(s) 120, as shown in FIG. 6, may process the input type data 602 using the linearize component 330 to determine the linearized context data 504a.

The system(s) 120 may determine (708) first summary data (e.g., summary data 522a) using the first linearized context data and the document(s). As shown in FIG. 5, the summary generator 200 may process the input data 502 using the document encoder 212 and process the linearized context data 504a (based on the first input type) using the context encoder 214. The decoder 220 may generate a summary based on the attention mechanism 216 causing the decoder 220 to focus on the first input type when generating the summary, and thus, the generated summary may be responsive to a first input type. The summary generator 200 may focus on one or more portion of the document(s) that correspond to the first input type to generate the first summary. For example, if the first input type is a product question, then the summary generator 200 may focus on the portions that provide information of the product features to generate the first summary.

The system(s) 120 may store (710) the first summary data 522a in a data storage (e.g., an indexed summaries storage 530). The first summary data 522a may be associated with a tag identifying the first input type. The summary data 522 may be text data, token data, or other meaning representation data.

In a similar manner, the system(s) 120 may generate, from the same document(s), a second summary that is responsive to a second input type. The system(s) 120 may determine (712) a second input type (e.g., a news question), and determine the input type data 604 based on the second input type. The system(s) 120 may determine (714) second linearized context data 504b using the second input type and the linearize component 330 as shown in FIG. 6. The system(s) 120 may determine (716) second summary data (e.g., 522b) using the second linearized context data 504b and the document(s). As shown in FIG. 5, the summary generator 200 may process the input data 502 using the document encoder 212 and process the linearized context data 504b (based on the second input type) using the context encoder 214. The decoder 220 may generate a summary based on the attention mechanism 216 causing the decoder 220 to focus on the second input type when generating the summary, and thus, the generated summary may be responsive to the second input type. The summary generator 200 may focus on one or more portion of the document(s) that correspond to the second input type to generate the second summary. For example, if the second input type is a current news question, then the summary generator 200 may focus on the portions that provide current news/information to generate the second summary. The system(s) 120 may store (718) the second summary data 522b in the indexed summaries storage 530. The second summary data 522b may be associated with a tag identifying the second input type.

Referring to FIG. 7B, the system(s) 120 may generate, from the same document(s), summaries focused on particular keywords. The system(s) 120 may determine (730) a first keyword. The first keyword may be based on an entity that is frequently mentioned in the document(s) or that is the document(s) is related to. For example, the keyword may be a name of a celebrity. The first keyword may be used to determine the entity data 606 (shown in FIG. 6). The system(s) 120 may determine (732) third linearized context data using the first keyword. The system(s) 120, as shown in FIG. 6, may process the entity data 606 using the linearize component 330 to determine the linearized context data 504c.

The system(s) 120 may determine (734) third summary data (e.g., summary data 522c) using the third linearized context data 504c and the document(s). As shown in FIG. 5, the summary generator 200 may process the input data 502 using the document encoder 212 and process the linearized context data 504c (based on the first keyword) using the context encoder 214. The decoder 220 may generate a summary based on the attention mechanism 216 causing the decoder 220 to focus on the first keyword when generating the summary, and thus, the generated summary may correspond to the first keyword.

The system(s) 120 may store (736) the third summary data 522c in the indexed summaries storage 530. The third summary data 522c may be associated with a tag identifying the first keyword.

In a similar manner, the system(s) 120 may generate, from the same document(s), a fourth summary that corresponds to a second keyword. The system(s) 120 may determine (738) a second keyword. The second keyword may be based on another entity that is frequently mentioned in the document(s) or that is the document(s) is related to. For example, the second keyword may be a name of a location/geographic region. The second keyword may be used to determine the entity data 608 (shown in FIG. 6). The system(s) 120 may determine (740) fourth linearized context data using the second keyword. The system(s) 120, as shown in FIG. 6, may process the entity data 608 using the linearize component 330 to determine the linearized context data 504d.

The system(s) 120 may determine (742) fourth summary data (e.g., summary data 522d) using the fourth linearized context data 504d and the document(s). As shown in FIG. 5, the summary generator 200 may process the input data 502 using the document encoder 212 and process the linearized context data 504d (based on the second keyword) using the context encoder 214. The decoder 220 may generate a summary based on the attention mechanism 216 causing the decoder 220 to focus on the second keyword when generating the summary, and thus, the generated summary may correspond to the second keyword.

The system(s) 120 may store (744) the fourth summary data 522d in the indexed summaries storage 530. The fourth summary data 522d may be associated with a tag identifying the second keyword.

In this manner, the indexed summaries storage 530 may store different context-based summaries for the same document(s). In some embodiments, the system(s) 120 may receive a user input requesting information on a topic for which summaries were previously generated and stored in the indexed summaries storage 530. The system(s) 120 may retrieve summaries from the indexed summaries storage 530 based on the topic indicated in the user input. The system(s) 120 may determine context data corresponding to the user input, for example, data similar to the context data 300 shown in FIG. 3. Based on one or more of the context data corresponding to the user input, the system(s) 120 may select one of the summaries as being responsive to the user input. For example, if the user input is a general information question, then the system(s) 120 may select a summary tagged with the input type=general information question. Using the selected summary, the system(s) 120 may generate output data to present to the user 5.

Figure 8:
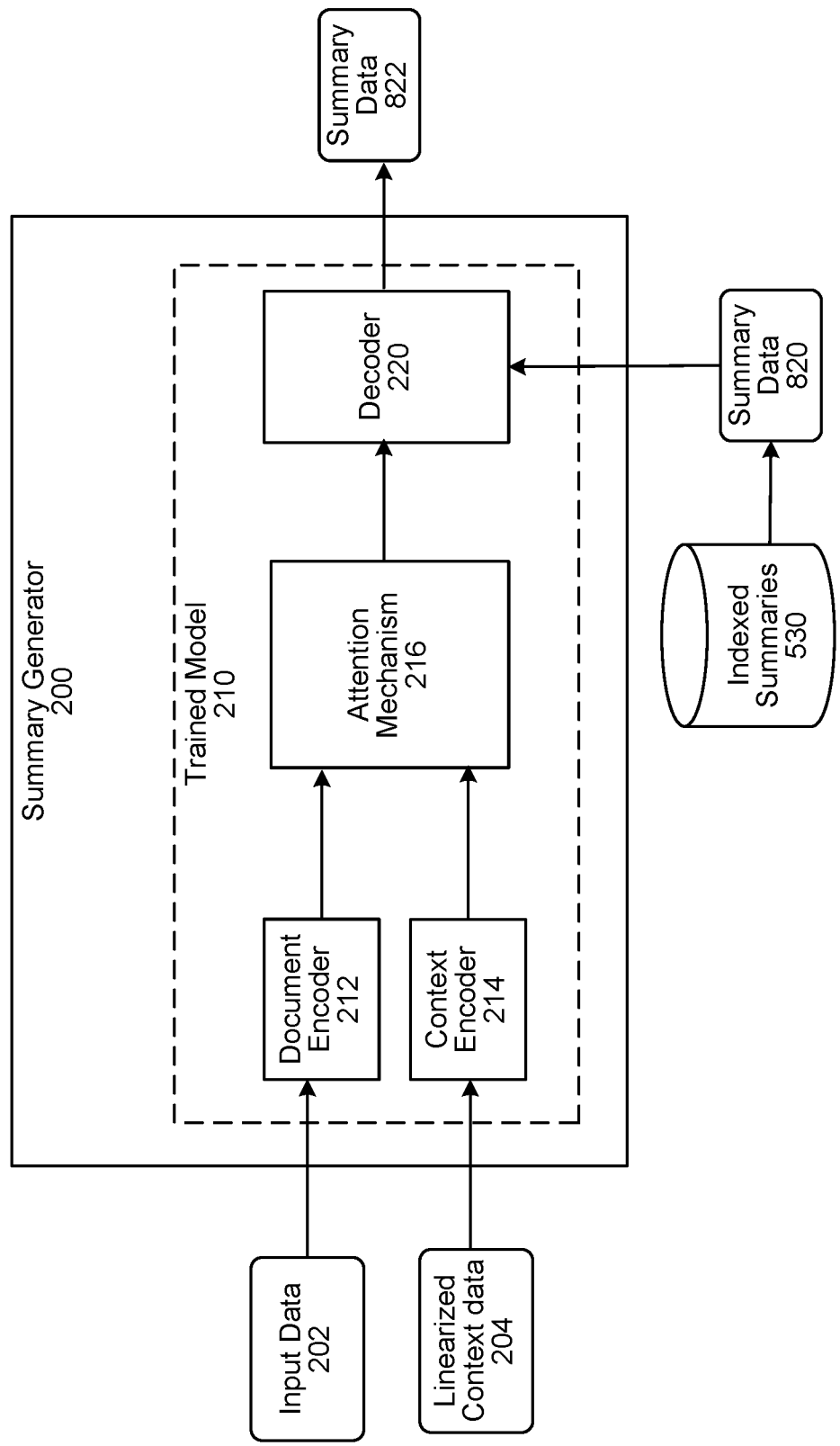
FIG. 8 is a conceptual diagram showing how a system may edit stored summary data based on context data corresponding to a user input, according to embodiments of the present disclosure.
Figure 9:
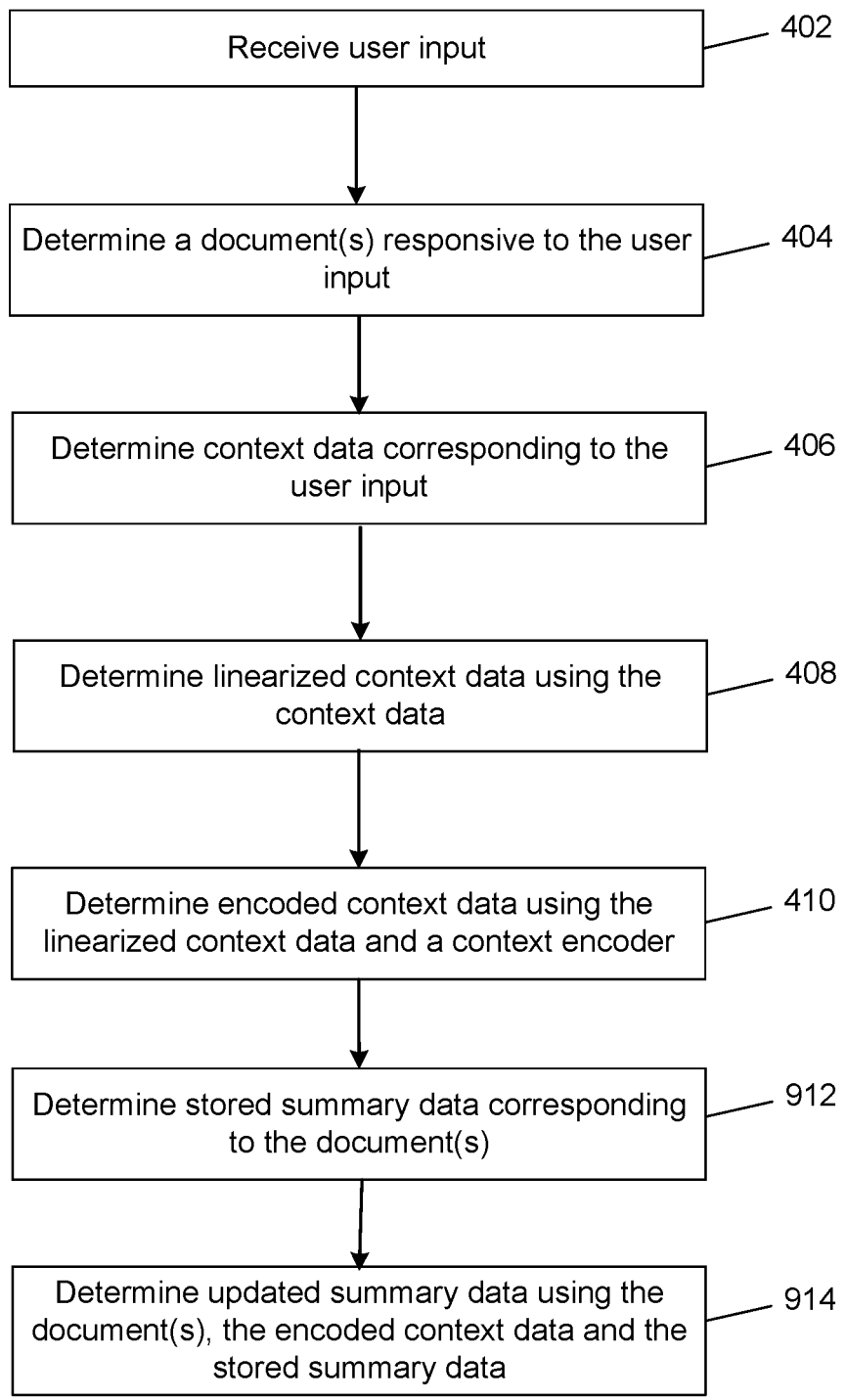
FIG. 9 is a flowchart illustrating a process that the system of FIG. 8 may perform to determine summary data responsive to a user input, according to embodiments of the present disclosure.

FIG. 8 is a conceptual diagram showing how the system(s) 120 may edit stored summary data 820 based on context data corresponding to a user input. The summary data 820 may be a generic summary (non-context based summary) for the input data 202. FIG. 9 is a flowchart illustrating a process that the system(s) 120 may perform to determine summary text data responsive to a user input. The first few steps of the process may be similar to the process described in relation to FIG. 4. For example, the system(s) 120 may receive (402) a user input and may determine (404) a document(s) responsive to the user input. The determined document(s) may be used to determine the input data 202 shown in FIG. 8. The system(s) 120 may determine (406) context data corresponding to the user input, may determine (408) linearized context data using the context data, and may determine (410) encoded context data using the linearized context data and the context encoder 214 as shown in FIG. 8.

To generate a summary responsive to the user input, in this example embodiment, the system(s) 120 may determine (912) stored summary data (e.g., summary data 820) corresponding to the document(s). As shown in FIG. 8, the system(s) 120 may retrieve stored data 820 representing a summary for the input data 202. The system(s) 120 may determine (914) updated summary data (e.g., summary data 822) using the document(s), the encoded context data and the stored summary data. As shown in FIG. 8, the decoder 220 may use the stored summary data 820 and the attention mechanism 216 causing the decoder 220 to focus on the context data represented in the linearized context data 204 to generate the summary data 822. The decoder 220, in this case, may edit the summary data 820 based on the linearized context data 204 to generate the summary data 822, rather than generating the summary data 822 token-by-token, as may be the case in the embodiments described in relation to FIGS. 2 and 5.

Figure 10:
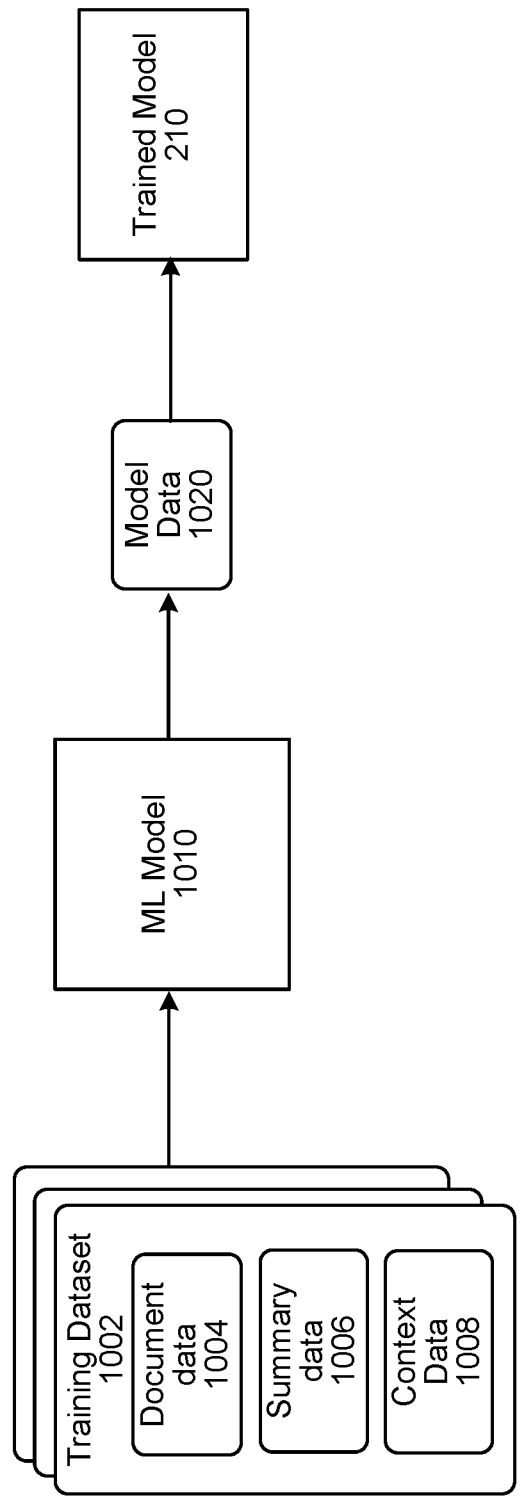
FIG. 10 is conceptual diagram showing how the summary generator may be trained, according to embodiments of the present disclosure.

FIG. 10 is a conceptual diagram showing how the summary generator 200 may be trained, according to embodiments of the present disclosure. A machine learning (ML)

model 1010 may process training dataset 1002 to generate model data 1020. The ML model 1010 may be an encoder-decoder architecture similar to the trained model 210, for example, including a document encoder, a context encoder, and a decoder. Each of these components may be a neural network(s), such as RNN, CNN, etc. Additionally, the ML model 1010 may include an attention mechanism that is trained to focus attention on portions of the document text based on the context data.

The training dataset 1002 may include multiple instances of training data. One or more of the training data instances may include document data 1004 representing a document(s) for which a summary is to be generated. The document data 1004 may be text data, audio data, language-agnostic/token-based meaning representation data, intent/slot data, or other meaning representation data. One or more of the training data instances may also include summary data 1006 representing a reference summary for the corresponding document data 1004. The summary data 1006 may be text data, token data, or other meaning representation data. One or more of the training data instances may include context data 1008 based on which the summary data 1006 is determined. For example, the document data 1004 may include a first entity and a second entity, the context data 1008a may include data corresponding to the first entity, and the summary data 1006a may be focused on the first entity, rather than the second entity. The training dataset 1002 may include another instance of training data, where the document data 1004 may be the same, but the context data 1008b may include data corresponding to the second entity, and the summary data 1006b may be focused on the second entity, rather than the first entity.

In some embodiments, the context data 1008 may be linearized context data. For example, data corresponding to the first entity may be processed using the linearize component 330 to determine a linearized representation of the first entity, and the linearized representation of the first entity may be stored as the context data 1008 for training operations.

The model data 1020 may represent weights, parameters and other data learned by the ML model 1010 during training operations. After the ML model 1010 is trained, the resulting model data 1020 may be used to generate the trained model 210.

The system 100 may operate using various components as illustrated in FIG. 11. The various components may be located on a same or different physical devices. Communication between various components may occur directly or across a network(s) 199.

A microphone or array of microphones (of or otherwise associated with a device 110) may capture audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may determine if the speech is directed at the device 110/system 120. In at least some embodiments, such determination may be made using a wakeword detection component 1120. The wakeword detection component 1120 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1120 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1120 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 1120 detects a wakeword, the device 110 may "wake" and begin transmitting audio data 1111, representing the audio 11, to the system 120. The audio data 1111 may include data corresponding to the detected wakeword, or the device 110 may remove the portion of the audio corresponding to the detected wakeword prior to sending the audio data 1111 to the system 120.

The system 120 may include an orchestrator component 1130 configured to, among other things, coordinate data transmissions between components of the system 120. The orchestrator component 1130 may receive the audio data 1111 from the device 110, and send the audio data 1111 to an ASR component 1150.

The ASR component 1150 transcribes the audio data 1111 into ASR output data including one or more ASR hypotheses. An ASR hypothesis may be configured as a textual interpretation of the speech, or may be configured in another manner, such as one or more tokens. Each ASR hypothesis may represent a different likely interpretation of the speech in the audio data 1111. Each ASR hypothesis may be associated with a score representing a confidence of ASR processing performed to determine the ASR hypothesis with which the score is associated.

The ASR component 1150 interprets the speech in the audio data 1111 based on a similarity between the audio data 1111 and pre-established language models. For example, the ASR component 1150 may compare the audio data 1111 with models for sounds (e.g., subword units, such as phonemes, etc.) and sequences of sounds to identify words that match the sequence of sounds of the speech represented in the audio data 1111.

In at least some instances, instead of the device 110 receiving audio 11, the device 110 may receive a text-based (e.g., typed) natural language user input. The device 110 may determine text data 1113 representing the typed natural language user input, and may send the text data 1113 to the system 120, wherein the text data 1113 is received by the orchestrator component 1130.

The orchestrator component 1130 may send the text data 1113 or ASR output data output, depending on the type of natural language user input received, to a NLU component 1160. The NLU component 1160 processes the ASR output data or text data to determine one or more NLU hypotheses embodied in NLU output data. The NLU component 1160 may perform intent classification (IC) processing on the ASR output data or text data to determine an intent of the natural language user input. An intent corresponds to an action to be performed that is responsive to the natural language user input. To perform IC processing, the NLU component 1160 may communicate with a database of words linked to intents. For example, a music intent database may link words and phrases such as "quiet," "volume off," and "mute" to a <Mute> intent. The NLU component 1160 identifies potential intents by comparing words and phrases in ASR output data or text data to the words and phrases in an intents database. In at least some embodiments, the NLU component 1160 may communicate with multiple intents databases, with each intents database corresponding to one or more intents associated with a particular skill.

For example, IC processing of the natural language user input "play my workout playlist" may determine an intent of <PlayMusic>. For further example, IC processing of the natural language user input "call mom" may determine an intent of <Call>. In another example, IC processing of the natural language user input "call mom using video" may determine an intent of <VideoCall>. In yet another example, IC processing of the natural language user input "what is today's weather" may determine an intent of <OutputWeather>.

The NLU component 1160 may also perform named entity recognition (NER) processing on the ASR output data or text data to determine one or more portions (which may be referred to as one or more slots) of the natural language user input that may be needed for post-NLU processing (e.g., processing performed by a skill). For example, NER processing of the natural language user input "play [song name]" may determine a slot corresponding to "SongName: [song name]." For further example, NER processing of the natural language user input "call mom" may determine a slot corresponding to "Recipient: Mom." In another example, NER processing of the natural language user input "what is today's weather" may determine a slot corresponding to "Date: Today."

In at least some embodiments, the intents identifiable by the NLU component 1160 may be linked to one or more grammar frameworks with "slots" to be filled. Each slot of a grammar framework corresponds to a portion of ASR output data or text data that the NLU component 1160 believes corresponds to an entity. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 1160 may perform NER processing to identify words in ASR output data or text data as subject, object, verb, preposition, etc. based on grammar rules and/or models. Then, the NLU component 1160 may perform IC processing that involves using the identified verb to identify an intent. Thereafter, the NLU component 1160 may again perform NER processing to determine a grammar model associated with the identified intent. For example, a grammar model for a <PlayMusic> intent may specify a list of slots applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRF), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 1160 may generate NLU output data including one or more NLU hypotheses, with each NLU hypothesis including the intent and slot(s) determined from IC processing and NER processing of the ASR output data or text data. In at least some embodiments, the NLU component 1160 may perform IC processing and NLU processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 1150 and the NLU component 1160). In at least some embodiments, the system 120 may implement a spoken language understanding (SLU) component configured to process audio data 1111 to determine NLU output data.

The SLU component may be equivalent to a combination of the ASR component 1150 and the NLU component 1160. Yet, the SLU component may process audio data 1111 and directly determine the NLU output data, without an intermediate step of generating ASR output data. As such, the SLU component may take audio data 1111 representing speech and attempt to make a semantic interpretation of the speech. That is, the SLU component may determine a meaning associated with the speech and then implement that meaning. For example, the SLU component may interpret audio data 1111 representing speech from the user 5 in order to derive a desired action. The SLU component may output a most likely NLU hypothesis, or multiple NLU hypotheses associated with respective confidence or other scores (such as probability scores, etc.).

The NLU component 1160 may send the NLU output data to the orchestrator component 1130. The orchestrator component 1130 may send the top-scoring NLU hypothesis (in the NLU output data) to a skill associated with the NLU hypothesis.

The system 120 may include one or more skill components 1190 and/or may communicate with one or more skill systems 1125 via one or more skill components 1190. As used herein, a "skill" may refer to a skill component 1190, a skill system 1125, or a combination of a skill component 1190 and a skill system 1125. A skill may be configured to execute with respect to NLU output data. For example, for an NLU hypothesis including a <GetWeather> intent, the system 120 (and more particularly the orchestrator component 1130) may invoke a weather skill to determine and output weather information for a geographic location represented in a user profile or corresponding to a location of the device 110 that captured the corresponding natural language user input. For further example, for an NLU hypothesis including a <BookRide> intent, the system 120 (and more particularly the orchestrator component 1130) may invoke a taxi skill to book a requested ride. In another example, for an NLU hypothesis including a <BuyPizza> intent, the system 120 (and more particularly the orchestrator component 1130) may invoke a restaurant skill to place an order for a pizza. A skill may operate in conjunction between the system 120 and other devices, such as the device 110, restaurant electronic ordering systems, taxi electronic booking systems, etc. in order to complete certain functions. Inputs to a skill may come from speech processing interactions or through other interactions or input sources.

A skill may be associated with a domain, a non-limiting list of which includes a smart home domain, a music domain, a video domain, a weather domain, a communications domain, a flash briefing domain, a shopping domain, and a custom domain.

The system 120 may include the summary generator 200 that may be configured to generate summaries in response to a user input, as described in detail above. The system 120/the summary generator 200 may be in communication with a documents storage 1185 that may be store multiple source documents relating to different entities and topics, which may be used to determine the input data (e.g., input data 202 and 502) for the summary generator 200.

The system 120 may include a TTS component 1180 that determine audio data (e.g., synthesized speech) from text data using one or more different methods. Text data input to the TTS component 1180 may come from a skill, the orchestrator component 1130, or another component of the system 120.

In one method of synthesis called unit selection, the TTS component 1180 matches text data against a database of recorded speech. The TTS component 1180 selects matching units of recorded speech and concatenates the units together to form audio data. In another method of synthesis called parametric synthesis, the TTS component 1180 varies parameters such as frequency, volume, and noise to determine audio data including an artificial speech waveform. Parametric synthesis uses a computerized voice generator, sometimes called a vocoder.

The system 120 may include a user recognition component 1195. The user recognition component 1195 may recognize one or more users using various data. The user recognition component 1195 may take as input the audio data 1111. The user recognition component 1195 may perform user recognition by comparing speech characteristics, in the audio data 1111, to stored speech characteristics of users (e.g., stored speech characteristics associated with user profile identifiers associated with the device 110 that determined the audio data 1111). The user recognition component 1195 may additionally or alternatively perform user recognition by comparing biometric data (e.g., fingerprint data, iris data, retina data, etc.), received by the system 120 in correlation with a natural language user input, to stored biometric data of users (e.g., stored biometric data associated with user profile identifiers associated with the device 110 that determined the audio data 1111 or otherwise captured a user input). The user recognition component 1195 may additionally or alternatively perform user recognition by comparing image data (e.g., including a representation of at least a feature of a user), received by the system 120 in correlation with a natural language user input, with stored image data including representations of features of different users (e.g., stored image data associated with user profile identifiers associated with the device 110 that determined the audio data 1111 or otherwise captured a user input). The user recognition component 1195 may perform other or additional user recognition processes, including those known in the art. For a particular user input, the user recognition component 1195 may perform processing with respect to stored data of users associated with the device 110 that captured the user input.

The user recognition component 1195 determines whether a user input originated from a particular user. For example, the user recognition component 1195 may determine a first value representing a likelihood that a user input originated from a first user, a second value representing a likelihood that user input originated from a second user, etc. The user recognition component 1195 may also determine an overall confidence regarding the accuracy of user recognition processing.

The user recognition component 1195 may output a single user profile identifier corresponding to the most likely user that originated the user input. Alternatively, the user recognition component 1195 may output multiple user profile identifiers (e.g., in the form of an N-best list) with respective values representing likelihoods of respective users originating the user input. The output of the user recognition component 1195 may be used to inform NLU processing, processing performed by a skill, as well as processing performed by other components of the system 120 and/or other systems.

The system 120 may include profile storage 1170. The profile storage 1170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; as well as other data.

The profile storage 1170 may include one or more user profiles. Each user profile may be associated with a different user profile identifier. Each user profile may include various user identifying data. Each user profile may also include preferences of the user. Each user profile may include one or more device identifiers, representing one or more devices registered to the user. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1170 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 1170 may include one or more device profiles. Each device profile may be associated with a different device identifier/device profile identifier. A device profile may include various device identifying data, input/output characteristics, networking characteristics, etc. A device profile may also include one or more user profile identifiers, corresponding to one or more user profiles associated with the device profile. For example, a household device's profile may include the user profile identifiers of users of the household.

The foregoing describes illustrative components and processing of the system 120. In at least some embodiments, the device 110 may be configured to include some or all of the components, and perform some or all of the processing, of the system 120 described above. FIG. 12 illustrates such a configured device 110.

In at least some embodiments, the system 120 may receive the audio data 1111 from the device 110, to recognize speech corresponding to a spoken input in the received audio data 1111, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 1280) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 11, the device 110 may include a wakeword detection component 1120 configured to compare the audio data 1111 to stored models used to detect a wakeword (e.g., "Alexa") that indicates to the device 110 that the audio data 1111 is to be processed for determining NLU output data (e.g., slot data that corresponds to a named entity, label data, and/or intent data, etc.). In at least some embodiments, a hybrid selector 1224, of the device 110, may send the audio data 1111 to the wakeword detection component 1120. If the wakeword detection component 1120 detects a wakeword in the audio data 1111, the wakeword detection component 1120 may send an indication of such detection to the hybrid selector 1224. In response to receiving the indication, the hybrid selector 1224 may send the audio data 1111 to the system 120 and/or the ASR component 1250. The wakeword detection component 1120 may also send an indication, to the hybrid selector 1224, representing a wakeword was not detected. In response to receiving such an indication, the hybrid selector 1224 may refrain from sending the audio data 1111 to the system 120, and may prevent the ASR component 1250 from further processing the audio data 1111. In this situation, the audio data 1111 can be discarded.

The device 110 may conduct its own speech processing using on-device processing components, such as an ASR component 1250 and an NLU 1260, similar to the manner discussed above with respect to the ASR component 1150 and the NLU component 1160 of the system 120. The device 110 may also internally include, or otherwise have access to, other components such as one or more skill components 1290 capable of executing commands based on NLU output data or other results determined by the device 110/system 120, a user recognition component 1295 (configured to process in a similar manner to that discussed above with respect to the user recognition component 1195 of the system 120), profile storage 1270 (configured to store similar profile data to that discussed above with respect to the profile storage 1170 of the system 120), or other components. In at least some embodiments, the profile storage 1270 may only store profile data for a user or group of users specifically associated with the device 110. Similar to as described above with respect to FIG. 11, a skill component 1290 may communicate with a skill system(s) 1125. The device 110 may also include the summary generator 200, described above, to generate summaries in response to user inputs. The device 110 may be in communication with the documents storage 1185.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 1224, of the device 110, may include a hybrid proxy (HP) 1226 configured to proxy traffic to/from the system 120. For example, the HP 1226 may be configured to send messages to/from a hybrid execution controller (HEC) 1227 of the hybrid selector 1224. For example, command/directive data received from the system 120 can be sent to the HEC 1227 using the HP 1226. The HP 1226 may also be configured to allow the audio data 1111 to pass to the system 120 while also receiving (e.g., intercepting) this audio data 1111 and sending the audio data 1111 to the HEC 1227.

In at least some embodiments, the hybrid selector 1224 may further include a local request orchestrator (LRO) 1228 configured to notify the ASR component 1250 about the availability of new audio data 1111 that represents user speech, and to otherwise initiate the operations of on-device language processing when new audio data 1111 becomes available. In general, the hybrid selector 1224 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 1111 is received, the HP 1226 may allow the audio data 1111 to pass through to the system 120 and the HP 1226 may also input the audio data 1111 to the on-device ASR component 1250 by routing the audio data 1111 through the HEC 1227 of the hybrid selector 1224, whereby the LRO 1228 notifies the ASR component 1250 of the audio data 1111. At this point, the hybrid selector 1224 may wait for response data from either or both of the system 120 or the on-device language processing components. However, the disclosure is not limited thereto, and in some examples the hybrid selector 1224 may send the audio data 1111 only to the on-device ASR component 1250 without departing from the disclosure. For example, the device 110 may process the audio data 1111 on-device without sending the audio data 1111 to the system 120.

The on-device ASR component 1250 is configured to receive the audio data 1111 from the hybrid selector 1224, and to recognize speech in the audio data 1111, and the on-device NLU component 1260 is configured to determine a user intent from the recognized speech, and to determine how to act on the user intent by generating NLU output data which may include directive data (e.g., instructing a component to perform an action). Such NLU output data may take a form similar to that as determined by the NLU component 1160 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic API call with a same logical operation as a remotely-determined directive. In other words, a device-determined directive may mimic a remotely-determined directive by using a same, or a similar, format as the remotely-determined directive.

An NLU hypothesis (output by the NLU component 1260) may be selected as usable to respond to a natural language user input, and local response data may be sent (e.g., local NLU output data, local knowledge base information, internet search results, and/or local directive data) to the hybrid selector 1224, such as a "ReadyToExecute" response. The hybrid selector 1224 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 1111 to the system 120, and the response data from the system 120 may include the unique identifier to identify which natural language user input the response data corresponds.

In at least some embodiments, the device 110 may include, or be configured to use, one or more skill components 1290 that may work similarly to the skill component(s) 1190 implemented by the system 120. The skill component(s) 1290 may correspond to one or more domains that are used in order to determine how to act on a spoken input in a particular way, such as by outputting a directive that corresponds to the determined intent, and which can be processed to implement the desired operation. The skill component(s) 1290 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 1125. For example, a skill system 1125 may be located in a remote environment (e.g., separate location) such that the device 110 may only communicate with the skill system 1125 via the network(s) 199. However, the disclosure is not limited thereto. For example, in at least some embodiments, a skill system 1125 may be configured in a local environment (e.g., home server and/or the like) such that the device 110 may communicate with the skill system 1125 via a private network, such as a local area network (LAN).

As used herein, a "skill" may refer to a skill component 1290, a skill system 1125, or a combination of a skill component 1290 and a skill system 1125.

Figure 13:
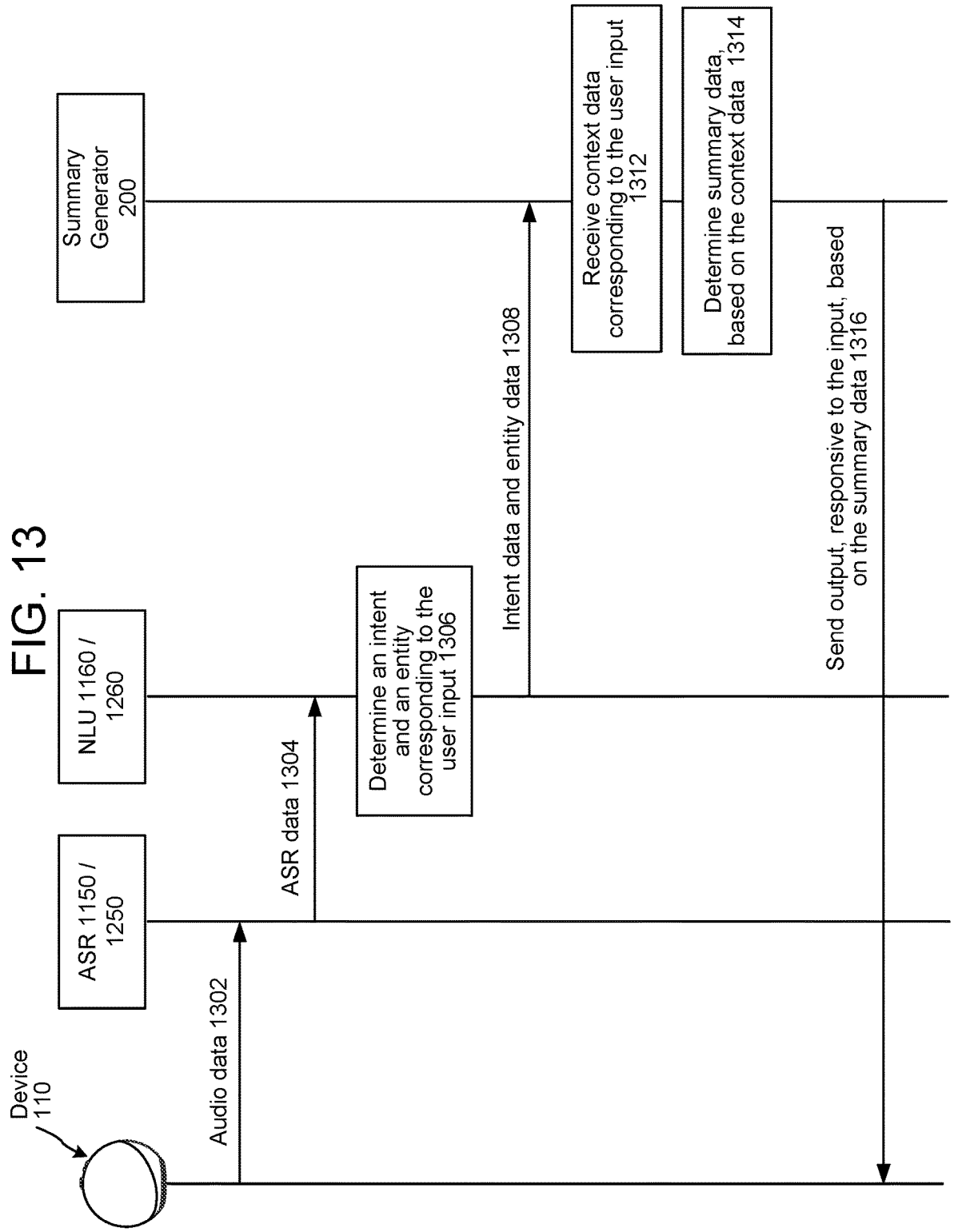
FIG. 13 is a signal flow diagram illustrating how a user input may be processed, according to embodiments of the present disclosure

FIG. 13 is a signal flow diagram illustrating how a user input may be processed by the components of the device 110 or the system(s) 120, according to embodiments of the present disclosure. The device 110 may capture audio representing a spoken natural language input. For example, the user 5 may say "tell me about [celebrity name]" or "what's new in [topic]?" In another example, the user 5 may say "start my daily news briefing" and request a news briefing, which may be based on (depending on system configuration), current news or currently trending topics/entities in the news. In yet another example, the user 5 may be engaged in an on-going dialog (exchange of user inputs and system-generated responses), and the user input corresponding to the audio data may be an input during the dialog. In a further example, the user 5 may say "is [product name] good at cleaning?"

The device 110 may send (1302) audio data, corresponding to the user input, to the ASR component 1150/1250 to perform ASR processing and determine ASR data corresponding to the audio data 1302 as described above in connection with FIG. 11. The ASR component 1150/1250 may send (1304) the ASR data to the NLU component 1160/1260 to perform NLU processing. The NLU component 1160/1260 may determine (1306) intent and entity data corresponding to the user input, as described above in connection with FIG. 11. Based on the NLU processing, the NLU component 1160/1260 (or another component, such as the orchestrator 1130/LRO 1228) may determine that an output responsive to the user input is to be a summary. For example, certain intents, corresponding to the user input, may indicate that the user 5 is requesting a summary or that a response including a summary may be beneficial to the user 5. Such example intents include, but are not limited to, {ReceiveNewsIntent}, {ReceiveInformation}, {QuestionAnswerIntent}, {ProductInformationIntent}, etc. The NLU component 1160/1260 may send (1308) the intent data and entity data to the summary generator 200.

The summary generator 200 may receive (1312) context data corresponding to the user input. In some embodiments, the orchestrator 1130/LRO 1228 or another component of the system(s) 120 may send the context data to the summary generator 200. The context data may include one or more of the context data types 300 shown in FIG. 3. The summary generator 200 may determine (1314) summary data based on the context data 1314. In some embodiments, the summary generator 200 may generate the summary text data in real-time, in response to receiving the user input, as described in relation to FIG. 2. In other embodiments, the summary generator 200 may retrieve the summary text data from the indexed summaries storage 530 based on the context data, as described in relation to FIG. 5. In yet other embodiments, the summary generator 200 may determine the summary text data by editing stored summary text data to be focused on the context data, as described in relation to FIG. 8.

The summary generator 200 (or another component, such as the orchestrator 1130/LRO 1228) may determine and send (1316) an output, responsive to the input, based on the summary data. In some embodiments, the output may be synthesized speech determined using the summary data and the TTS processing component 1180/1280. The device 110 may output audio representing the synthesized speech and providing the summary to the user 5 in response to the user input. In some embodiments, the output may be text data (and other data, such as image data, video data, etc.) based on the summary data, and may be displayed at the device 110 in response to the user input. In yet other embodiments, the output may be a message (e.g., email, SMS, etc.) or a notification (e.g., push notification) that includes text data (and other data, such as image data, video data, etc.) based on the summary data. The output may be one or more of synthesized speech, text, message and/or notification.

In some embodiments, the summary generator 200 may determine an output type based on the summary data. For example, a lengthy summary may be provided to the user 5 as displayed text, a message or a notification. In another example, a shorter summary may be provided to the user 5 as synthesized speech.

Machine learning (ML) is a valuable computing technique that allows computing systems to learn techniques for solving complex problems without needing an explicit algorithm for the computing system to follow. ML may use a trained model that consists of internally configured operations that can manipulate a particular type of input data to determine a desired result. Trained models are used in many computing tasks such as computer vision, speech processing, predictive analyses, and many more.

Trained models come in a variety of forms including trained classifiers, Support Vector Machines (SVMs), neural networks (such as deep neural networks (DNNs), recurrent neural networks (RNNs), or convolutional neural networks (CNNs)), random forests, isolation forests, and others. As an example, a neural network typically includes an input layer, an output layer and one or more intermediate hidden layers where the input layer is configured to take in a certain kind of data and the output layer is configured to output the desired kind of data resulting from the network and the hidden layer(s) perform a variety of functions to generate output data from the input data.

Various techniques may be used to train ML models including backpropagation, statistical learning, supervised learning, semi-supervised learning, stochastic learning, or other known techniques. In supervised learning a model may be configured to infer a function from labeled training data. Thus a computing system may use training data in the form of training examples that provide examples of the kinds of input data the model will be configured to process at runtime as well as an accompanying "ground truth" for each training example. The ground truth provides the correct response for the respective training example, thus providing a complete example that can be used to train the model. Other data that may be used to train a model may include training parameters such as error functions, weights or other data that can be used to guide the training of a model.

Figure 14:
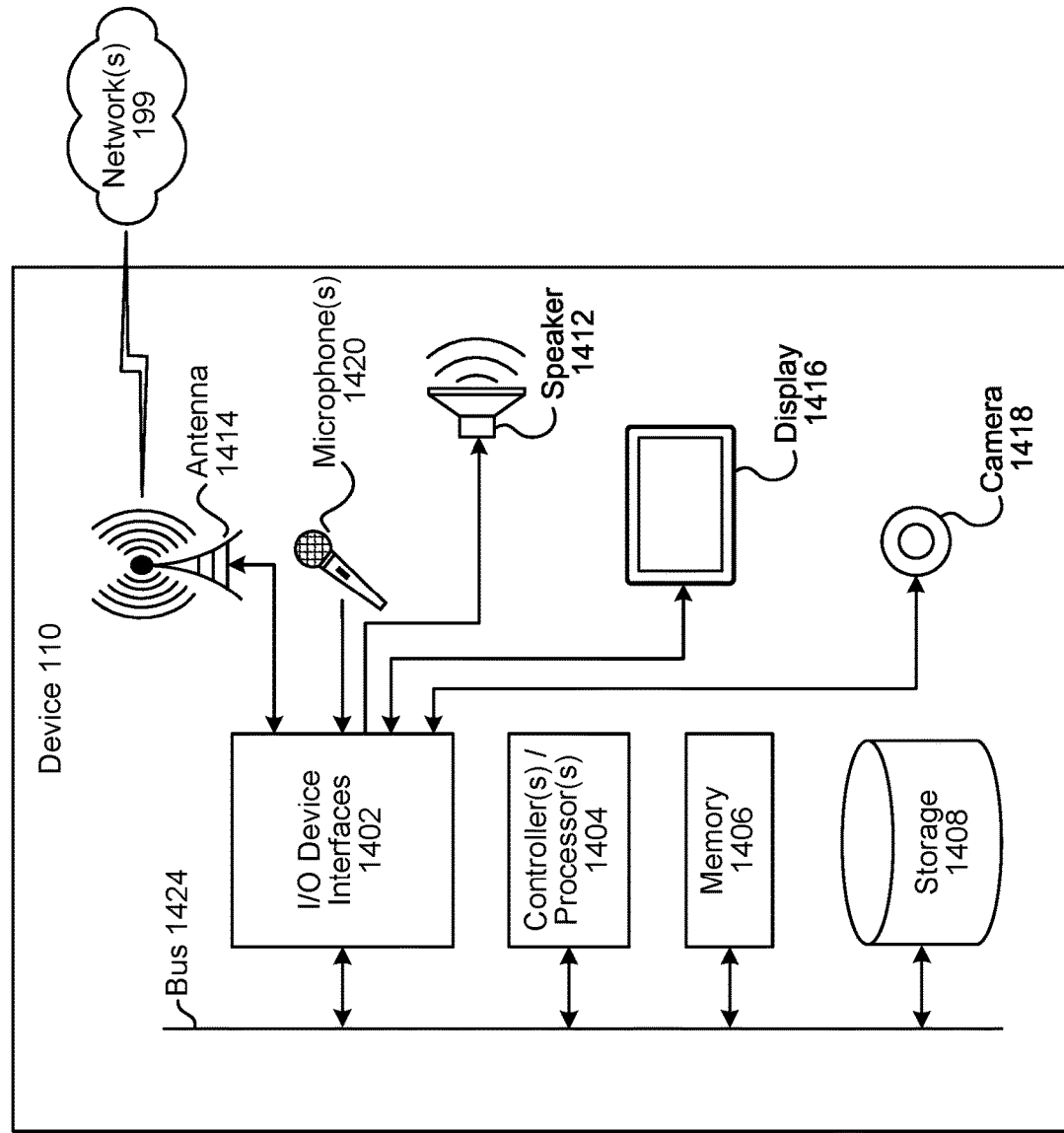
FIG. 14 is a block diagram conceptually illustrating example components of a device, according to embodiments of the present disclosure.
Figure 15:
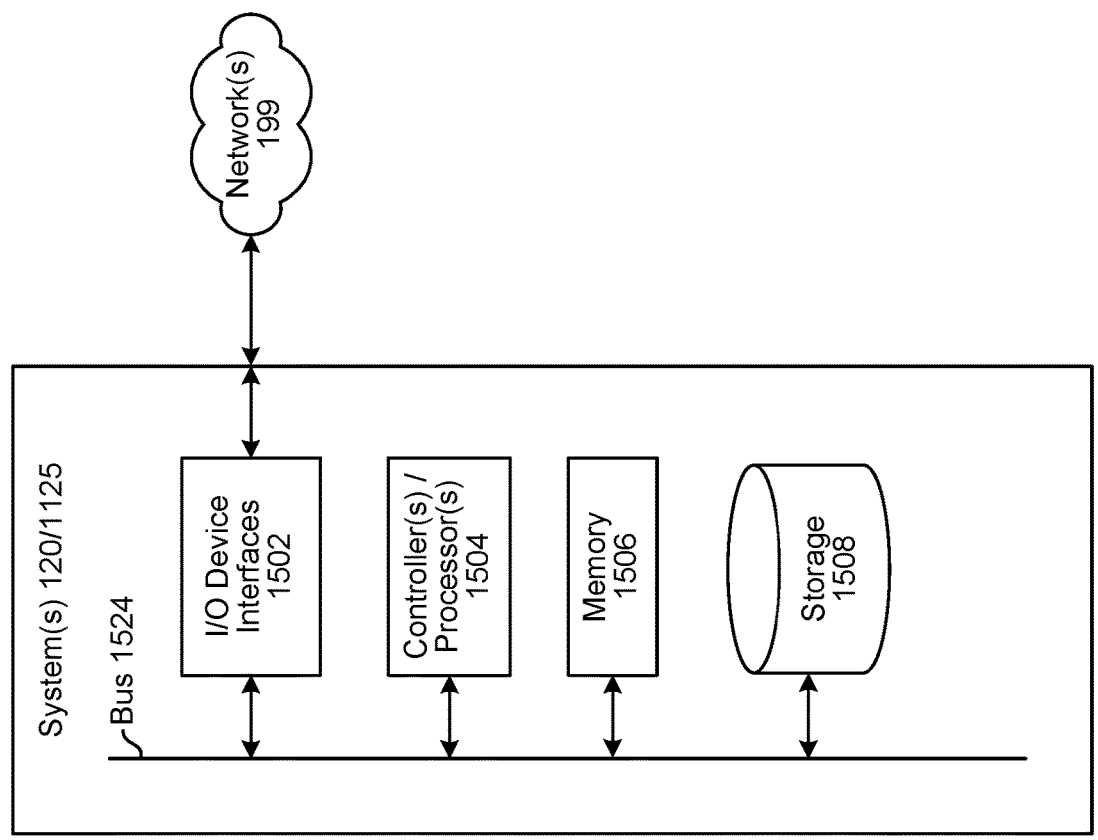
FIG. 15 is a block diagram conceptually illustrating example components of a system, according to embodiments of the present disclosure.

FIG. 14 is a block diagram conceptually illustrating example components of a device 110 according to the present disclosure. FIG. 15 is a block diagram conceptually illustrating example components of a system, such as the system 120 or a skill system 1125. A system (120/1125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/1125) may be included in the system 100 of the present disclosure, such as one or more systems 120 for performing ASR processing, one or more systems 120 for performing NLU processing, and one or more skill systems 1125, etc. In operation, each of these systems may include computer-readable and computer-executable instructions that reside on the respective device (120/1125), as will be discussed further below.

Each of these devices (110/120/1125) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/1125) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/1125) may also be connected to removable or external non-volatile memory and/or storage (such as a removable memory card, memory key drive, networked storage, etc.) through respective input/output device interfaces (1402/1502).

Computer instructions for operating each device (110/120/1125) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/1125) includes input/output device interfaces (1402/1502). A variety of components may be connected through the input/output device interfaces (1402/1502), as will be discussed further below. Additionally, each device (110/120/1125) may include an address/data bus (1424/1524) for conveying data among components of the respective device. Each component within a device (110/120/1125) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1414, the input/output device interfaces 1402 may connect to a network(s) 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device 110, the system 120, and/or a skill system 1125 may include their own dedicated processors, memory, and/or storage. Alternatively, one or more of the components of the device 110, the system 120, and/or a skill system 1125 may utilize the I/O interfaces (1402/1502), processor(s) (1404/1504), memory (1406/1506), and/or storage (1408/1508) of the device(s) 110, system 120, or the skill system 1125, respectively. Thus, the ASR component 1150 may have its own I/O interface(s), processor(s), memory, and/or storage; the NLU component 1160 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system 120, and a skill system 1125, as described herein, are illustrative, and may be located as a stand-alone device or may be included, in whole or in part, as a component of a larger device or system.

As illustrated in FIG. 16, multiple devices (110a-1101) may process as part of the system 100. The network(s) 199 may include a local or private network or may include a wide network such as the Internet. Devices may be connected to the network(s) 199 through either wired or wireless connections. For example, the system 100 may include a speech-controlled device(s) 110a, a smart phone(s) 110b, a smart watch(s) 110c, a tablet computer(s) 110d, a vehicle(s) 110e, a speech-controlled display device(s) with a display 110f, a smart television(s) 110g, a washer(s)/dryer(s) 110h, a refrigerator(s) 110i, a microwave(s) 110j, earbuds 1101, and/or a wearable ring(s) 110m.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving, from a device, first audio data representing a first spoken input;
determining that the first spoken input corresponds to a request for information related to a first entity;
receiving, from a storage medium, first text data of a document corresponding to the first spoken input, the first text data representing a first plurality of words, the first text data having been stored in the storage medium prior to receipt of the first audio data;
determining first context data corresponding to the first spoken input, the first context data representing at least the first entity;
determining a first representation of the first context data;
processing the first text data using a first encoder of a machine learning (ML) model to generate first encoded data;
processing the first representation using a second encoder of the ML model to generate second encoded data;
processing first encoded data and the second encoded data using a decoder of the ML model to determine second text data representing a first summary of information described in the document, the second text data corresponding to a second plurality of words including at least one word selected from the first plurality of words, wherein the ML model is configured to cause the decoder to weight one or more elements of the first representation when selecting one or more words from the first plurality of words to include in the second plurality of words so as to cause the first summary to include information corresponding to the first entity;
determining first output data using the second text data; and
sending, to the device, the first output data in response to the first spoken input.

2. The computer-implemented method of claim 1, further comprising:
determining the first context data including an input type corresponding to the first spoken input;
determining first token data corresponding to the first entity and including a first indicator representing the first token data corresponds to entity data;
determining second token data corresponding to the first spoken input and including a second indicator representing the second token data corresponds to input type data; and
determining the first representation including the first token data and the second token data.

3. A computer-implemented method, comprising:
receiving, from a first device, first input data corresponding to a first user input;
processing the first input data to determine a command to provide a summary of information described in a document, the document having been stored in a storage medium prior to receipt of the first input data;
receiving, from the storage medium, second input data corresponding to a first plurality of words represented in the document;
determining first context data corresponding to the first user input;
determining a first representation of the first context data;
processing the second input data using a first encoder of a machine learning (ML) model to generate first encoded data;
processing the first representation using a second encoder of the ML model to generate second encoded data;
processing the first encoded data and the second encoded data using a decoder of the ML model to determine first summary data representing a first summary of the information described in the document, the first summary data corresponding to a second plurality of words including at least one word selected from the first plurality of words, wherein the ML model is configured to cause the decoder to weight one or more elements of the first representation when selecting one or more words from the first plurality of words to include in the second plurality of words; and
causing output of a representation of the second plurality of words in response to the first user input.

4. The computer-implemented method of claim 3, further comprising:
   determining that the first user input corresponds to a request for information corresponding to an entity; and
   determining the first context data to include a representation of the entity.

5. The computer-implemented method of claim 3, further comprising:
   determining that the first context data corresponds to a first user input type;
   receiving second context data corresponding to a second user input type;
   determining a second representation of the second context data;
   processing the second representation using the second encoder to generate third encoded data;
   processing the first encoded data and the third encoded data using the decoder to determine second summary data representing a second summary of the information described in the document;
   storing first data associating the first summary data with the first user input type; and
   storing second data associating the second summary data with the second user input type.

6. The computer-implemented method of claim 3, further comprising:
   receiving third input data corresponding to a second user input;
   determining that the second user input corresponds to a request for information corresponding to an entity;
   determining second context data corresponding to the second user input, the second context data at least representing the entity;
   determining a second representation of the second context data;
   processing the second representation using the second encoder to generate third encoded data;
   determining that the first summary data corresponds to a response to the second user input;
   processing the first encoded data, the third encoded data and the first summary data using the decoder to determine second summary data representing a second summary of the information described in the document;
   determining output data using the second summary data; and
   causing presentation of the output data in response to the second user input.

7. The computer-implemented method of claim 3, further comprising:
   determining that the first context data represents at least an entity name;
   determining token data corresponding to the entity name and including an indicator that the token data corresponds to entity data; and
   determining the first representation including the token data.

8. The computer-implemented method of claim 3, wherein first input data comprises audio data representing a spoken natural language input, and the method further comprises:
   determining natural language understanding (NLU) data corresponding to the spoken natural language input;
   determining, based at least in part the NLU data, the first context data corresponding to the spoken natural language input, the first context data including an entity name represented in the spoken natural language input and an input type corresponding to the spoken natural language input;
   determining first token data corresponding to the entity name and including a first indicator that the first token data corresponds to entity data;
   determining second token data corresponding to the input type and including a second indicator that the second token data corresponds to input type data; and
   determining the first representation including the first token data and the second token data.

9. The computer-implemented method of claim 3, wherein first input data comprises audio data representing a spoken natural language input, and the method further comprises:
   receiving dialog history data representing a first user input and a first system-generated response to the first user input, the dialog history data corresponding to a dialog session;
   determining that the spoken natural language input corresponds to the dialog session; and
   determining the first context data based at least in part on the dialog history data and the spoken natural language input.

10. A system comprising:
    at least one processor; and
    at least one memory including instructions that, when executed by the at least one processor, cause the system to:
       receive, from a first device, first input data corresponding to a first user input;
       process the first input data to determine a command to provide a summary of information described in a document, the document having been stored in a storage medium prior to receipt of the first input data;
       receive, from the storage medium, second input data corresponding to a first plurality of words represented in the document;
       determine first context data corresponding to the first user input;
       determine a first representation of the first context data;
       process the second input data using a first encoder of a machine learning (ML) model to generate first encoded data;
       process the first representation using a second encoder of the ML model to generate second encoded data;
       process first encoded data and the second encoded data using a decoder of the ML model to determine first summary data representing a first summary of the information described in the document, the first summary data corresponding to a second plurality of words including at least one word selected from the first plurality of words, wherein the ML model configured to cause the decoder to weight one or more elements of the first representation when selecting one or more words from the first plurality of words to include in the second plurality of words; and
       cause output of a representation of the second plurality of words in response to the first user input.

11. The system of claim 10, wherein the at least one memory further includes additional instructions that, when executed by the at least one processor, further cause the system to:
    determining that the first user input corresponds to a request for information corresponding to an entity; and determine the first context data to include a representation of the entity.

12. The system of claim 10, wherein the at least one memory further includes additional instructions that, when executed by the at least one processor, further cause the system to:
   determine that the first context data corresponds to a first user input type;
   receive second context data corresponding to a second user input type;
   determine a second representation of the second context data;
   process the second representation using the second encoder to generate third encoded data;
   process the first encoded data and the third encoded data using the decoder to determine second summary data representing a second summary of the information described in the document;
   store first data associating the first summary data with the first user input type; and
   store second data associating the second summary data with the second user input type.

13. The system of claim 10, wherein the at least one memory further includes additional instructions that, when executed by the at least one processor, further cause the system to:
   receive third input data corresponding to a second user input;
   determine that the second user input corresponds to a request for information corresponding to an entity;
   determine second context data corresponding to the second user input, the second context data at least representing the entity;
   determine a second representation of the second context data;
   process the second representation using the second encoder to generate third encoded data;
   determine that the first summary data corresponds to a response to the second user input;
   process the first encoded data, the third encoded data and the first summary data using the decoder to determine second summary data representing a second summary of the information described in the document;
   determine output data using the second summary data; and
   cause presentation of the output data in response to the second user input.

14. The system of claim 10, wherein the at least one memory further includes additional instructions that, when executed by the at least one processor, further cause the system to:
   determine that the first context data represents at least an entity name;
   determine token data corresponding to the entity name and including an indicator that the token data corresponds to entity data; and
   determine the first representation including the token data.

15. The system of claim 10, wherein the first input data comprises audio data representing a spoken natural language input, and the at least one memory further includes additional instructions that, when executed by the at least one processor, further cause the system to:
   determine natural language understanding (NLU) data corresponding to the spoken natural language input;
   determine, based at least in part the NLU data, the first context data corresponding to the spoken natural language input, the first context data including an entity name represented in the spoken natural language input and an input type corresponding to the spoken natural language input;
   determine first token data corresponding to the entity name and including a first indicator that the first token data corresponds to entity data;
   determine second token data corresponding to the input type and including a second indicator that the second token data corresponds to input type data; and
   determine the first representation including the first token data and the second token data.

16. The system of claim 10, wherein the first input data comprises audio data representing a spoken natural language input, and the at least one memory further includes additional instructions that, when executed by the at least one processor, further cause the system to:
   receive dialog history data representing a first user input and a first system-generated response to the first user input, the dialog history data corresponding to a dialog session;
   determine that the spoken natural language input corresponds to the dialog session; and
   determine the first context data based at least in part on the dialog history data and the spoken natural language input.

* * * * *